(12) United States Patent
Blech

(10) Patent No.: US 11,804,955 B1
(45) Date of Patent: Oct. 31, 2023

(54) METHOD AND SYSTEM FOR MODULATED WAVEFORM ENCRYPTION

(71) Applicant: CHOL, Inc., Irvine, CA (US)

(72) Inventor: Richard J. Blech, Irvine, CA (US)

(73) Assignee: CHOL, Inc., Irvine, CA (US)

( * ) Notice: Subject to any disclaimer, the term of this patent is extended or adjusted under 35 U.S.C. 154(b) by 0 days.

(21) Appl. No.: 17/024,388

(22) Filed: Sep. 17, 2020

Related U.S. Application Data

(60) Provisional application No. 62/900,186, filed on Sep. 13, 2019.

(51) Int. Cl.
| | |
|---|---|
| *H04L 29/06* | (2006.01) |
| *G06F 21/00* | (2013.01) |
| *H04L 9/08* | (2006.01) |
| *H04L 9/06* | (2006.01) |
| *H04L 9/32* | (2006.01) |
| *H04L 9/14* | (2006.01) |

(52) U.S. Cl.
CPC ............ *H04L 9/0825* (2013.01); *H04L 9/065* (2013.01); *H04L 9/085* (2013.01); *H04L 9/14* (2013.01); *H04L 9/3213* (2013.01)

(58) Field of Classification Search
CPC ....... H04L 9/0825; H04L 9/065; H04L 9/085; H04L 9/14; H04L 9/3213
See application file for complete search history.

(56) References Cited

U.S. PATENT DOCUMENTS

| | | | |
|---|---|---|---|
| 5,003,596 A | 3/1991 | Wood | |
| 5,297,207 A | 3/1994 | Degele | |
| 5,623,548 A | 4/1997 | Akiyama et al. | |
| 6,185,682 B1 | 2/2001 | Tang | |
| 6,246,768 B1 | 6/2001 | Kim | |
| 6,745,331 B1 | 6/2004 | Silverbrook | |
| 6,889,321 B1* | 5/2005 | Kung | H04M 7/0078 713/153 |
| 6,907,123 B1* | 6/2005 | Schier | H04K 1/00 370/335 |
| 7,093,137 B1 | 8/2006 | Sato et al. | |
| 7,143,288 B2 | 11/2006 | Pham et al. | |

(Continued)

FOREIGN PATENT DOCUMENTS

WO   WO 2017/176279 A1   10/2017

*Primary Examiner* — Lisa C Lewis
(74) *Attorney, Agent, or Firm* — Knobbe, Martens, Olson & Bear, LLP

(57) ABSTRACT

Embodiments of an automatic key delivery system and methods of use are described. One computerized method utilizing an automatic key delivery system includes operations of establishing, by a first network device, a communication session with a second network device, transmitting first content to the second network device during the communication session, wherein the first content is encrypted with a first encryption format, and transmitting second content to the second network device during the communication session, wherein the second content is encrypted with a second encryption format. The computerized method may further includes operations of receiving, from the second network device, third content during the communication session, wherein the third content is encrypted with the first encryption format, and decrypting the third content using a first cryptographic key corresponding to the first encryption format.

15 Claims, 16 Drawing Sheets

(56) References Cited

U.S. PATENT DOCUMENTS

| | | |
|---|---|---|
| 8,014,526 B2 | 9/2011 | Billhartz et al. |
| 8,744,078 B2 | 6/2014 | Coleridge |
| 9,590,951 B2 | 3/2017 | Tomkow |
| 10,154,371 B1 | 12/2018 | Rahat et al. |
| 10,892,889 B2 | 1/2021 | Coleridge et al. |
| 11,044,091 B1 | 6/2021 | Feinberg et al. |
| 2001/0031050 A1 | 10/2001 | Domstedt et al. |
| 2002/0023209 A1 | 2/2002 | Domstedt et al. |
| 2003/0053625 A1 | 3/2003 | Bially et al. |
| 2003/0172268 A1 | 9/2003 | Walmsley et al. |
| 2003/0210787 A1 | 11/2003 | Billhartz et al. |
| 2004/0203591 A1 | 10/2004 | Lee |
| 2005/0015589 A1 | 1/2005 | Silverman et al. |
| 2006/0129545 A1 | 6/2006 | Golle et al. |
| 2006/0227974 A1 | 10/2006 | Haraszti |
| 2007/0180272 A1 | 8/2007 | Trezise et al. |
| 2007/0219915 A1 | 8/2007 | Hatano |
| 2008/0168543 A1* | 7/2008 | von Krogh .............. H04L 9/12 726/9 |
| 2009/0103722 A1 | 4/2009 | Anderson et al. |
| 2009/0208006 A1 | 4/2009 | Candelore |
| 2009/0220071 A1 | 9/2009 | Gueron et al. |
| 2010/0017615 A1 | 1/2010 | Sorensen |
| 2010/0031036 A1* | 2/2010 | Chauncey .......... H04W 12/033 713/168 |
| 2010/0046755 A1 | 2/2010 | Fiske |
| 2010/0067687 A1 | 3/2010 | Chandramouli et al. |
| 2010/0290623 A1 | 11/2010 | Banks et al. |
| 2011/0243322 A1* | 10/2011 | Pudney ................. H04L 63/30 380/255 |
| 2012/0011351 A1 | 1/2012 | Mundra et al. |
| 2012/0204032 A1 | 8/2012 | Wilkins et al. |
| 2012/0331088 A1 | 12/2012 | O'Hare et al. |
| 2013/0067225 A1 | 3/2013 | Shochet et al. |
| 2013/0073850 A1 | 3/2013 | Zaverucha |
| 2013/0202111 A1 | 8/2013 | El Gamal et al. |
| 2013/0236112 A1 | 9/2013 | Oka et al. |
| 2013/0237278 A1 | 9/2013 | Oka et al. |
| 2013/0290708 A1* | 10/2013 | Diaz ...................... H04L 63/08 713/165 |
| 2014/0237261 A1 | 8/2014 | Diep et al. |
| 2014/0310779 A1 | 10/2014 | Lof et al. |
| 2015/0033016 A1 | 1/2015 | Thornton et al. |
| 2015/0222517 A1 | 8/2015 | McLaughlin et al. |
| 2015/0278634 A1 | 10/2015 | Kato et al. |
| 2015/0304102 A1 | 10/2015 | Nakano et al. |
| 2016/0080143 A1 | 3/2016 | Kindarji et al. |
| 2016/0119119 A1 | 4/2016 | Calapodescu et al. |
| 2016/0119296 A1 | 4/2016 | Laxminarayanan et al. |
| 2016/0301958 A1* | 10/2016 | Srinivasan ......... H04N 21/8352 |
| 2017/0085371 A1 | 3/2017 | Coleridge |
| 2017/0085545 A1 | 3/2017 | Lohe et al. |
| 2017/0132181 A1 | 5/2017 | Van As et al. |
| 2017/0207912 A1 | 7/2017 | Camenisch et al. |
| 2017/0264439 A1 | 9/2017 | Muhanna et al. |
| 2017/0337549 A1 | 11/2017 | Wong |
| 2017/0357967 A1* | 12/2017 | Sykora ................ H04L 63/0861 |
| 2018/0046658 A1 | 2/2018 | Han |
| 2018/0076955 A1 | 3/2018 | Shields et al. |
| 2019/0260595 A1* | 8/2019 | Walton ................ H04L 63/0823 |

\* cited by examiner

200

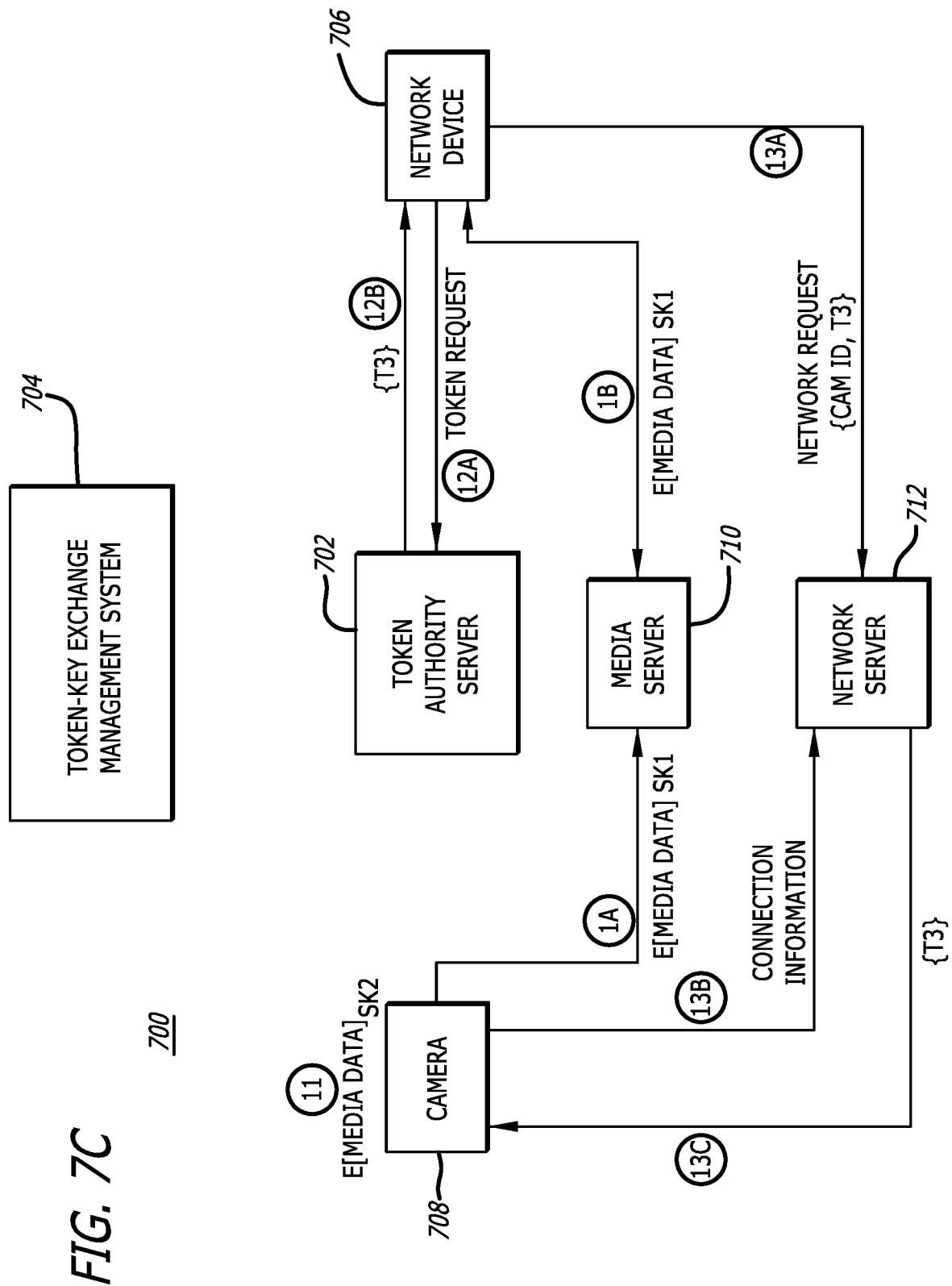

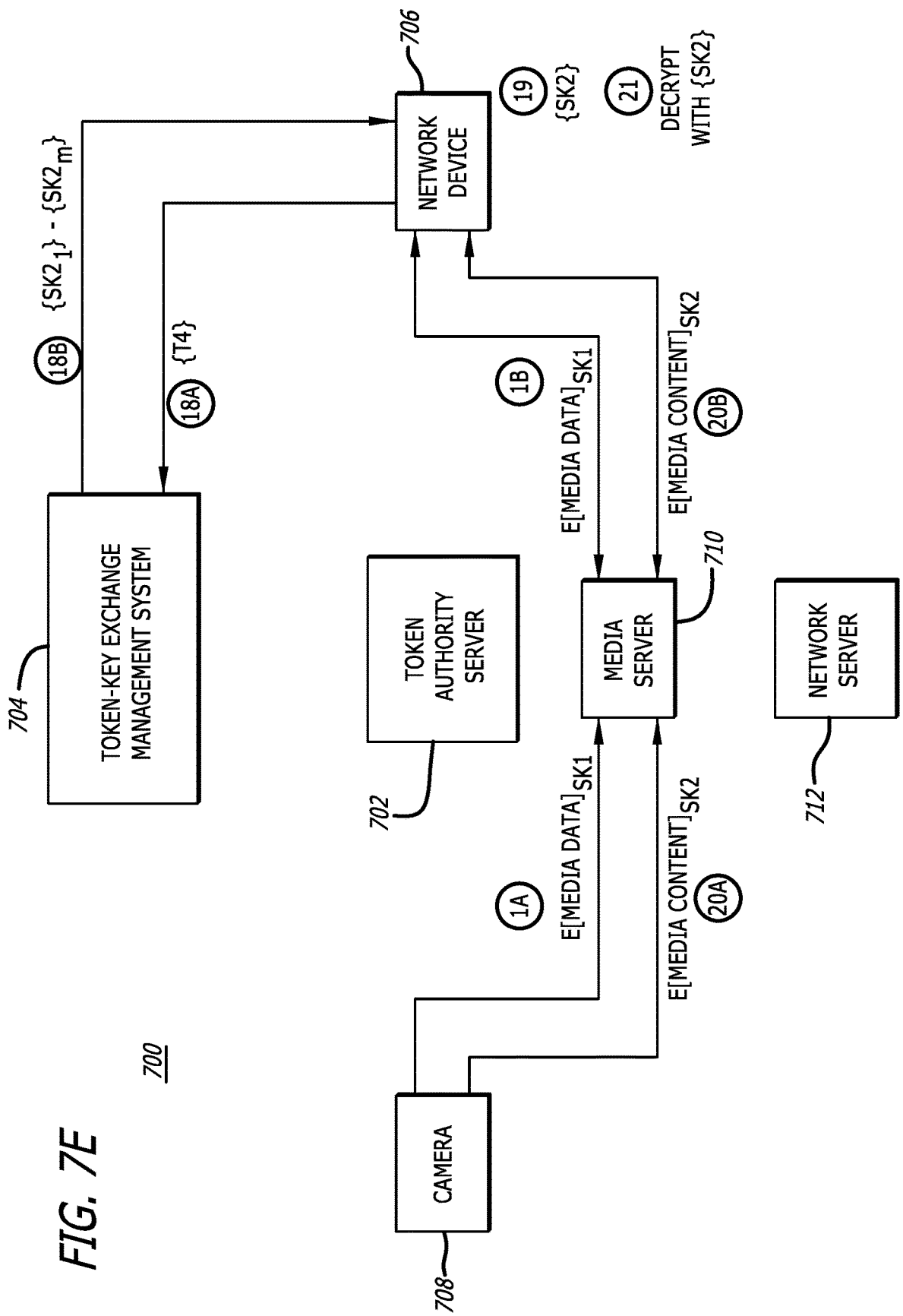

METHOD AND SYSTEM FOR MODULATED WAVEFORM ENCRYPTION

RELATED APPLICATION

The present application claims priority to U.S. Provisional Patent Application No. 62/900,186 filed Sep. 13, 2019, the contents of which applications are incorporated herein by reference.

Information in this patent application is controlled by the U.S. Government and authorized for access only by U.S. persons and licensed non-U.S. persons. Please contact the assignee, Secure Channels, Inc., for further guidance if you wish to give access to the subject application to a non-U.S. person. This statement attaches to any use or incorporation of said patent application into other applications or any other use.

FIELD

Embodiments of the disclosure relate to the field of cryptography. More specifically, embodiments of the disclosure are directed to a cryptographic key delivery system that supports cryptographically secure transmissions without reliance on Public Key Infrastructure (PKI) in which a plurality of cryptographic keys having varying cryptographic properties are utilized for encryption and decryption within a single communication session.

GENERAL BACKGROUND

The transmission of digital content as messages over public networks, such as electronic mail (email) messages, text messages, or Voice over IP (VoIP) messages for example, has become an integral part of daily life for individuals and businesses. Herein, a "message" may be construed as one or more packets or frames, or any other collection of digital content sent in a prescribed format. Transmitting messages via a public network, such as the Internet for example, typically requires the use of various networked electronic devices, generally referred to as "hops." A message is transferred across multiple hops along an intended communication path from a sender to a receiver.

Encryption is a common strategy for scrambling the content of messages sent over the Internet. Such scrambling renders the content unreadable by any unauthorized receiver, which protects the sender against interlopers attempting to intercept messages in transit and interpret their contents. Secure Socket Layer (SSL) and Transport Layer Security (TLS) are commonly used protocols for encrypting messages transmitted over the Internet.

Asymmetric cryptographic schemes, such as SSL and TLS for example, utilize public/private key authorization and digital certificate authentication as requisite mechanisms for encryption and decryption. Unfortunately, asymmetric cryptographic schemes are subject to a few disadvantages. For instance, given the explosive growth of cryptographically secure electronic devices, especially secure sensors or other types of Internet of Things (IoT) devices, one disadvantage is the need to install digital certificates on each secure electronic device in order for that device to support asymmetric cryptographic communications. This required installation is costly and difficult to perform and/or manage for companies producing tens or hundreds of millions of IoT devices. Furthermore, besides the difficulty of installing digital certificates, another disadvantage surrounds the subsequent administration of these digital certificate. The amount of resources to monitor hundreds of millions of digital certificates installed in these secure electronic devices, such as simply confirming validity of the installed digital certificates, is staggering.

Yet another disadvantage associated with asymmetric cryptography is directed to potential and known problems experienced by asymmetric cryptographic deployments in general. Examples of potential and known problems include the threat caused by compromised certificate authorities, a lack of "perfect forward secrecy," and Unicode-character man-in-the-middle attacks that can exist on compromised wireless networks. Such attacks spoof communications using "homograph-similar" address attacks, which implies that a man-in-the-middle attack is still possible, even when using SSL.

Additionally, it is common today for communication sessions to span extended periods of time. For example, instant messaging applications may open a single communication session between two or more network devices with the single communication session remaining open and active for hours at a time, if not longer. Additionally, a single communication session initiated by a video chat application remains open for the duration of the chat session. Although these communication sessions routinely utilize encryption schemes, the extended period of time each communication session is open and active provides opportunity for attackers to compromise the encryption scheme. Specifically, as a single cryptographic key is used for the entirety of these extended-length communication sessions, attackers are provided with the time required to comprise the encryption scheme and decrypt intercepted transmissions.

Therefore, a key delivery system for reliable and secure transmission of symmetric keys, such as Scalable One-Time Pad (S-OTP) keys for example, would harden cryptographic security for communications over a network and avoid the difficulties experienced by asymmetric cryptographic systems that are reliant on digital certificates for key delivery. In addition, a key delivery system that provides for the utilization of a plurality of cryptographic keys within a single communication session would strengthen the encryption scheme.

BRIEF DESCRIPTION OF THE DRAWINGS

Embodiments of the invention are illustrated by way of example and not by way of limitation in the figures of the accompanying drawings, in which like references indicate similar elements and in which:

FIGS. 7A-7E are illustrations of a plurality of operations performed during a single communication session in a second embodiment in accordance with some embodiments;

DETAILED DESCRIPTION

Figure 1A:
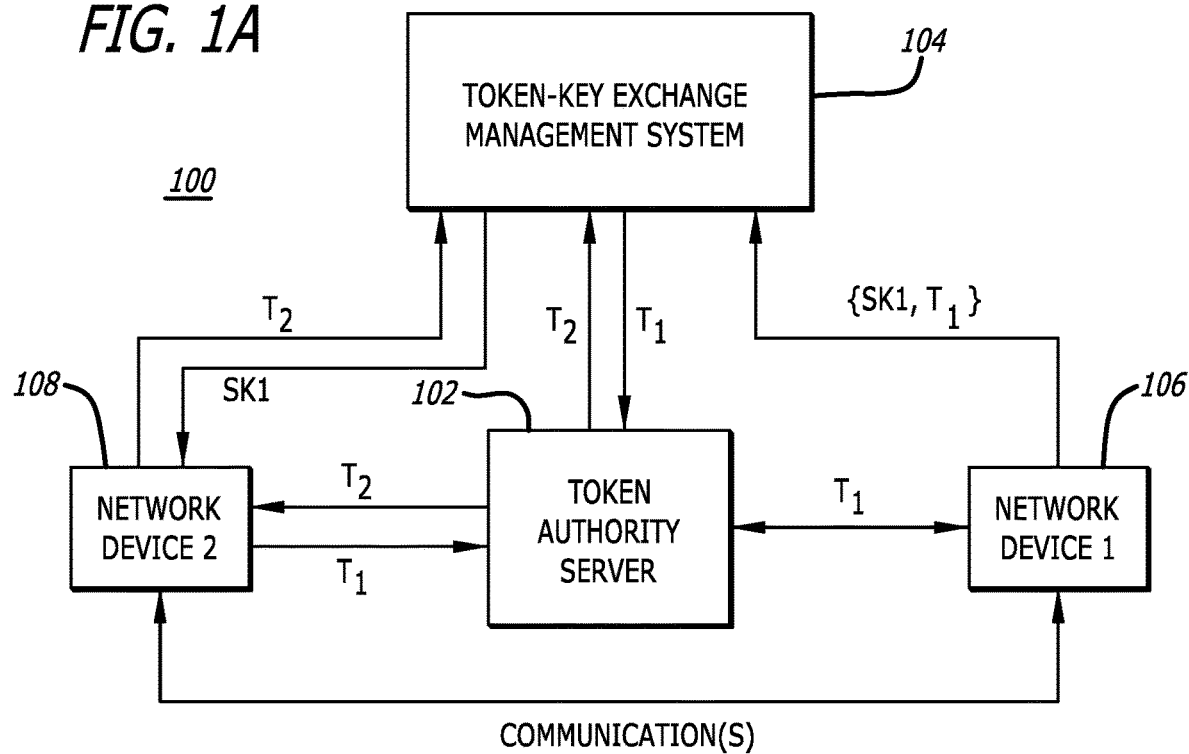
FIG. 1A is an exemplary embodiment of the general architecture of a key delivery system utilizing a first cryptographic key within a first communication session in accordance with some embodiments.

Embodiments of the disclosure are directed to a key delivery system that is configured to provide secure delivery of a plurality of cryptographic keys from a first network device (e.g., an "initiating device") to a targeted, second network device (e.g., a "participating device") during a single communication session. In particular, the key delivery system utilizes a streaming encryption scheme for hyper-securing data without the use of the Public Key Infrastructure (PKI) paradigm and enables the use of multiple cryptographic keys during a single communication session without disrupting the session. In some embodiments, the multiple cryptographic keys may vary in strength. In some specific embodiments, the variation in strength of the encryption may be analogous to a waveform, i.e., randomly increasing and decreasing over time during a single communication session.

The key delivery system may feature a double-blind configuration in which none of the components forming the key delivery system stores identifying information directed to the sending network device, one or more targeted receiving network devices, and the intermediary network devices (e.g., token authority server, relay servers, etc.).

Embodiment 1—Token-Key Exchange Management (TKEM) System and a Single Key Value Pair In a first embodiment, the first and second network devices may be communicatively coupled to a hyper-secure token-key exchange management (TKEM) system that is configured to receive a single key value pair (KVP) from the first network device that comprises a cryptographic key and a first token (T1). In some embodiments, the cryptographic key may be generated using a seed from a quantum number generator. The TKEM system may be further configured to initiate a communication with the token authority server in an effort to obtain a substitute token (hereinafter, a "second token" (T2)) for the token (T1). Responsive to receipt of the token change request message from the TKEM system (following authentication of the TKEM system), the token authority server generates (or causes the generation of) a second token (T2). Data identifying the relationship between the first token (T1) and the second token (T2) is stored in ephemeral memory (token data store) accessible to the token authority server. In this embodiment and with respect to the single KVP, the TKEM system overwrites the first token (T1) with the received second token (T2) so that subsequent queries for a particular cryptographic key require designation of the second token (T2) in lieu of the first token (T1).

Furthering the first embodiment, in a secure transmission from the first network device to the second network device, the first network device provides the token (T1) and content encrypted with a first cryptographic key (SK1) to one or more targeted receiving network devices. In should be noted that in some embodiments, the token (T1) may be provided in a communication that does not include encrypted content, wherein such a communication may be either in-band or out-of-band.

For a unicast transmission, a single receiving network device is targeted to receive the encrypted content while multiple receiving network devices may be targeted by a multicast transmission. As the operations are similar, for purposes of clarity, the secure transmission will be discussed as unicast transmission.

Upon receipt of the secure transmission, the second network device communicates with the token authority server by transmitting a token lookup request message including the token (T1), which prompts return of the second token (T2) in a token lookup response message from the token authority server. In particular, the token authority server receives the token (T1) and uses the token (T1) as a lookup to access the second token (T2) from the token data store. Thereafter, the token authority server returns the second token (T2) to the second network device. Additionally, upon confirmed receipt of the token lookup response message by the second network device, the token authority server deletes a storage entry with the T1/T2 mapping or tags this entry to be overwritten.

Upon receipt of the second token (T2), the second network device generates a key segment request message and transmits the key segment request message to the TKEM system. The key segment request message includes the second token (T2) and prompts the TKEM system to return the first cryptographic key (SK1) corresponding to the second token (T2). Upon receipt of the first cryptographic key (SK1) from the TKEM system, the second network device may decrypt data received from the first network device encrypted with the first cryptographic key (SK1). For instance, the encrypted data may have been received in the above-referenced secure transmission that included the first token (T1). Alternatively, or in addition, the encrypted data may be received in a transmission separate from the above-referenced secure transmission. Data may now be transmitted between the first and second network devices continuously within a single communication session using the first cryptographic key (SK1). For example, the first and second network devices may continuously stream video data that is encrypted (and subsequently decrypted) using the first cryptographic key (SK1).

In order to further protect the secrecy of the data transmission between the first and second network devices during the communication session, the first and second network devices may utilize the key delivery system to alter the cryptographic key used for encryption and decryption at predetermined (or otherwise agreed upon) intervals/triggering events. More specifically, the first network device may generate a second cryptographic key (SK2), provide the second network device with information enabling retrieval of the second cryptographic key (SK2) and notify the second network device of the intention to use the second cryptographic key (SK2). Assuming confirmation of receipt of the second cryptographic key (SK2) by the second network device, the first network device begins encrypting data to be transmitted to the second network device during the same communication session using the second cryptographic key (SK2) at the established time.

For instance, in one embodiment, when the communication session corresponds to a video chat session, the first and second network devices may use the first cryptographic key (SK1) to encrypt and decrypt each video frame during a first time interval (e.g., 0-29 seconds) and use the second cryptographic key (SK2) to encrypt and decrypt each video frame during a second time interval (e.g., 30-59 seconds). The first and second network devices may continue the changing of cryptographic keys at predetermined time intervals in an iterative manner during the course of the communication session.

In an alternative embodiment, when the communication session corresponds to a video chat session, the first and second network devices may use the first cryptographic key (SK1) to encrypt and decrypt each video frame for a predetermined number of frames (e.g., 900 frames transmitted) and use the second cryptographic key (SK2) to encrypt and decrypt each video frame for a second iteration of frames (e.g., a second set of 900 frames transmitted). The first and second network devices may continue the changing of cryptographic keys after one (or each) transmits a predetermined number of frames in an iterative manner during the course of the communication session. Although examples discussed herein relate to the transmission of video data, the same inventive concept of dynamically altering cryptographic keys used for encryption and decryption during a single communication session applies to other types of data.

More specifically with respect to the generation of the second cryptographic key (SK2) as discussed above, the first network device obtains a new token from the token authority, e.g., a "third token" (T3), and generates a second cryptographic key (SK2). The first network device then sends the second cryptographic key (SK2) to the TKEM system with token (T3). The TKEM system initiates a communication with the token authority server to obtain a substitute token (hereinafter, a "fourth token" (T4)) for the third token (T3). The first and second network devices then perform a handshake in which the token (T3) is provided to the second network device. The second network device transmits a token lookup request message including the token (T3) to the token authority server, which prompts return of the fourth token (T4). The second network device then generates and transmits a key segment request message to the TKEM system. In response to the key segment request message, the TKEM system returns the second cryptographic key (SK2) corresponding to the fourth token (T4). The second network device then completes the handshake by confirming receipt of the second cryptographic key (SK2) and, optionally, confirming the timing of the change from the use of the first cryptographic key (SK1) to the use of the second cryptographic key (SK2).

Embodiment 2—Token-Key Exchange Management (TKEM) System and a Plurality of KVPs In a second embodiment of the key delivery system wherein a plurality of cryptographic keys are provided from a first network device to a second network device, the first network device may be configured to generate a plurality of KVPs for use in cryptographically securing transmission of data to and from a second network device during a single communication session. Each of the KVPs includes a first token (T1) received from a token authority server and a portion of a first cryptographic key (SK1) generated by the sending network device. According to one embodiment of the disclosure, the first cryptographic key (SK1) may be a Scalable One-Time Pad (S-OTP).

More specifically, to protect its secrecy during conveyance from the sending network device to the receiving network device, the first cryptographic key (SK1) is separated into "M" key segments. Each key segment may be equivalent in length (e.g., equal number of bits or bytes) or may vary in length where some or all of the key segments have different lengths. According to one embodiment of the disclosure, prior to or contemporaneous with the encrypted transmission to the receiving network device, the sending network device is configured to transmit multiple KVPs to different relay servers within a cloud network. As described below, as an illustrative example in which the first cryptographic key (SK1) is separated into two key segments, the sending network device transmits a first KVP, including a first key segment (K1) of the first cryptographic key (SK1) and the first token (T1), to a first relay server. Additionally, the sending network device transmits a second KVP to a second relay server residing in a different geographic region than the first relay server. The second KVP includes a second key segment (K2) of the first cryptographic key (SK1) and the first token (T1).

Hence, the relay servers may be randomly (or pseudo-randomly) selected from a group of relay servers that are deployed within the cloud network and operate as part of the TKEM within the key delivery system. For this embodiment, the cloud network may be a public cloud network and the relay servers are positioned at different geographic regions where greater geographic separation of the KVPs may assist in preventing discovery of the first cryptographic key (SK1). In particular, where the Amazon® Web Services (AWS) operates as the cloud network, the relay servers may be Elastic Compute Cloud (EC2) server nodes located at distributed geographic locations. However, in lieu of a public cloud network, the cloud network may be deployed as a private cloud network.

According to one embodiment of the disclosure, instead of retaining the KVPs received from the sending network device, the relay servers may be adapted to perform a random or pseudo-random shuffling of the KVPs to different relay servers (hereinafter, "reassigned relay servers"). The shuffling maintains that each key segment and token combination (KVP) is retained by a different reassigned relay server, but ensures that the locations of the key segments are obfuscated from the sending network device. As this shuffling (re-transmission) of the KVPs to different reassigned relay servers is conducted in a random or pseudo-random manner, each relay server features a retry capability in the event that one of the KVPs is sent to a reassigned relay server that already retains a key segment identified by the same assigned token (T1). This retry capability relies on the reassigned relay server acknowledging receipt of a KVP after confirmation that no other key segments with the same token (T1) are currently retained by the reassigned relay server. Otherwise, based on a denial or lack of an acknowledgement message from a targeted reassigned relay server, the relay server retransmits the KVP to another reassigned relay server. This process may continue until an acknowledgement message is received confirming receipt and retention of the KVP.

Thereafter, according to an embodiment of the disclosure, each of the reassigned relay servers may be configured to initiate communications with the token authority server in efforts to obtain a substitute token (hereinafter, a "second token" (T2) for the token (T1)). When requested, this communication for a substitute token (T2), in the form of a token change request message, is conducted to further obfuscate the key segments forming the first cryptographic key (SK1) from the sending network device. Responsive to receipt of the token change request message from an authenticated relay server, the token authority server generates (or causes the generation of) a second token (T2). Data identifying the relationship between the first token (T1) and the second token (T2) is stored in ephemeral memory (token data store) accessible to the token authority server. For this embodiment, with the KVP, the reassigned relay servers overwrite the first token (T1) with the received second token (T2) so that subsequent queries for a particular cryptographic key require designation of the second token (T2) in lieu of the first token (T1).

According to one embodiment of the disclosure, as described in FIGS. 1A-6, in a secure transmission from the sending network device to the receiving network device, the sending network device provides the token (T1) and content encrypted with a first cryptographic key (SK1) to one or more targeted receiving network devices. For a unicast transmission, a single receiving network device is targeted to receive the encrypted content while multiple receiving network devices may be targeted by a multicast transmission. As the operations are similar, for purposes of clarity, the secure transmission will be discussed as unicast transmission.

Upon receipt of the secure transmission, the receiving network device communicates with the token authority server by transmitting a token lookup request message including the token (T1), which prompts return of the second token (T2) in a token lookup response message from the token authority server. In particular, the token authority server receives the token (T1) and uses the token (T1) as a lookup to access the second token (T2) from the token data store. Thereafter, the token authority server returns the second token (T2) to the receiving network device. Additionally, upon confirmed receipt of the token lookup response message by the receiving network device, the token authority server deletes a storage entry with the T1/T2 mapping or tags this entry to be overwritten.

Upon receipt of the second token (T2), the receiving network device generates one or more key segment request messages (e.g., separate unicast messages or a multicast message) to each relay server of the group of relay servers that are deployed within the cloud network and operate as part of the key delivery system. Each key segment request message includes the second token (T2) and prompts the recipient relay servers to return any stored key segment corresponding to the second token (T2). Upon receipt of the key segments from the reassigned relay servers (i.e., at least two different relay servers located at different locations within the cloud network), the receiving network device may recover the first cryptographic key (SK1) for decrypting the encrypted content within the received transmission.

Additionally, in order to further protect the secrecy of the data transmission between the first and second network devices during the communication session, the first and second network devices may utilize the key delivery system to alter the cryptographic key used for encryption and decryption at predetermined (or otherwise agreed upon) intervals. In a similar manner as discussed above with respect to the first embodiment, More specifically, the first network device may generate a second cryptographic key (SK2), provide the second network device with information enabling retrieval of the second cryptographic key (SK2) and notify the second network device of the intention to use the second cryptographic key (SK2). Assuming confirmation of receipt of the second cryptographic key (SK2) by the second network device, the first network device begins encrypting data to be transmitted to the second network device during the same communication session using the second cryptographic key (SK2) at the established time.

Generally, following the generation of the second cryptographic key (SK2) and provision of the second cryptographic key (SK2) to the TKEM system along with a third token (T3) as discussed above, the first and second network devices perform a handshake in which the token (T3) is provided to the second network device, and optionally, a proposed time at which the change from the use of the first cryptographic key (SK1) to the use of the second cryptographic key (SK2) is to occur. The second network device then retrieves the second cryptographic key (SK2) and completes the handshake by confirming receipt of the second cryptographic key (SK2) and, optionally, the time at which the change from the use of the first cryptographic key (SK1) to the use of the second cryptographic key (SK2) is to occur.

The above discussed embodiments, which will be explained in further detail below, are applicable to several network configurations each involving diverse network components. Examples of network configurations to which the above embodiments are applicable include chat sessions (Voice Over IP, video chat, instant messaging), firewall configurations, digital data signal streaming configurations (e.g., Apple TV®, Amazon Fire®, etc.) or other hardware-based data signal streaming configurations (e.g., involving sensors and, possibly, a server, such as IoT sensors). Although primarily discussed below with respect to chat sessions between two network devices, the novel cryptography techniques disclosed herein may be incorporated into a firewall device.

For example, inventive concepts disclosed herein may be utilized as secure virtual private network (VPN), which is a feature many firewalls include. In a typical VPN deployment, a public-key/private-key certificate secured communication session is established between a VPN client and the VPN server (e.g., the firewall). The inventive concepts disclosed herein may be utilized in conjunction with the firewall's internal encryption (e.g., augmenting the internal encryption (advanced encryption standard (AES) encryption) with a "Xotic" cipher, discussed below). Alternatively, the "Xotic" cipher may replace the internal encryption of the firewall. Additional detail is discussed below.

It is contemplated that the methods, functionality and features described herein may be embodied in whole or in part as software or firmware (defined below), which operates on any computing device or on a distributed system deploying one or more computing devices. Alternatively, it is contemplated that the methods, functionality and features described herein may be embodied, in whole or in part, as hardware.

I. Terminology

In the following description, certain terminology is used to describe aspects of the invention. For example, in certain situations, the terms "logic" and "component" are representative of hardware, firmware and/or software that is configured to perform one or more functions. As hardware, logic (or a component) may include circuitry having data processing or storage functionality. Examples of such processing or storage circuitry may include, but is not limited or restricted to the following: a processor; one or more processor cores; a programmable gate array; an I/O controller (e.g., network interface controller, disk controller, memory controller, etc.); an application specific integrated circuit; receiver, transmitter and/or transceiver circuitry; semiconductor memory; combinatorial logic, or combinations of one or more of the above components.

Logic (or a component) may be in the form of one or more software modules, such as executable code in the form of an operating system component, an executable application, firmware, an application programming interface (API), one or more subroutines, a function, a procedure, an applet, a plug-in, a servlet, a Component Object Model (COM) object, a routine, source code, object code, a shared library/dynamic linked library, a script, or one or more instructions. These software modules may be stored in any type of a suitable non-transitory storage medium, or transitory storage medium (e.g., electrical, optical, acoustical or other form of propagated signals such as carrier waves, infrared signals, or digital signals). Examples of a "non-transitory storage medium" may include, but are not limited or restricted to a programmable circuit; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or portable memory device; and/or a semiconductor memory. As firmware, the executable code is stored in persistent storage.

A "computing system" generally refers to either a physical electronic device featuring data processing and/or network connection functionality or a virtual electronic device being software that virtualizes at least a portion of the functionality of the physical electronic device. Examples of a computing system may include, but are not limited or restricted to any physical or virtual resource operating as a server, a network device (e.g., a mobile phone, a desktop or laptop computer, a wearable, a set-top box, a tablet, a netbook, a server, a device-installed mobile software, management console, etc.), a network adapter, or an intermediary communication device (e.g., router, firewall, etc.), a cloud service, or the like. Additional examples of a network device may include, but are not limited or restricted to the following: a server; a router or other signal propagation networking equipment (e.g., a wireless or wired access point); a set-top box; a video-game console; or an endpoint (e.g., a stationary or portable computer including a desktop computer, laptop, electronic reader, netbook or tablet; a smart phone; or wearable technology such as an Apple Watch®, Fitbit® fitness wristband, or other sensor-based component, including any sensors configured for participation within an internet-of-things (IoT) environment).

The term "transmission medium" is a physical or logical communication path to/from a network device. For instance, the communication path may include wired and/or wireless segments. Examples of wired segments include electrical wiring, optical fiber cable, or any other material to transport electrical signals while wireless segments may include infrared, radio frequency (RF), satellite signaling, or any other wireless signaling mechanism.

The term "computerized" generally represents that corresponding operations are conducted by hardware in combination with software and/or firmware. Also, the term "message" may be construed as one or more packets or frames, a command or series of commands, or any collection of bits having the prescribed format.

The term "segment" may be construed as a collection of bits. Each segment may feature the same bit (or byte) length or may feature different bit (or byte) lengths (with optional padding), based at least in part, on (i) the original key size and (ii) selected key separation value. For example, for a 256-bit key, in separating the key into two (2) key segments, each key segment would be 128-bits in length. Alternatively, for a 256-bit key, in separating the key into three (3) key segments, two key segment would be 85-bits in length and another key segment may be 86-bits in length. However, it is contemplated that a uniform bit length may be provided with reliance on padding and/or truncating of the key segments at the receiver.

A "cipher" is an encryption scheme that produces encrypted data from data in which a cryptographic key and algorithm are applied to the data. The cipher may include a block cipher that encrypted a series of contiguous bits at once as a group rather than one bit at a time. For example, one type of cipher "Xotic," described in U.S. Pat. No. 8,744,078, the entire contents of which are incorporated by reference. For the description below, however, the Xotic™ cipher may be one of many different types of cryptographic ciphers utilized for secured communications between network devices. As an option, a cipher suite may be available to allow a user (or administrator) to select which of the ciphers (all or some) are permitted for use by the network device. This provides enhanced flexibility and security by allowing an administrator to update, substitute, add, remove or deactivate (i.e., prevent further use of) a cipher from the cipher suite based on customer preferences, compromised ciphers, newly released (and more secure) ciphers, or the like. It should be noted that encryption as discussed herein may be performed on frame by frame basis (or other number of data frames, e.g., every 30 frames), or on a time-based interval basis (e.g., every 10 seconds, 30 seconds, etc.).

The term "subscription attribute" may refer to certain performance-based attributes (e.g., selected encryption strength represented by a key length setting and/or a key separation setting identifying a degree of segmentation of a cryptographic key prior to being uploaded to relay servers in the cloud network, quality of service "QoS" settings such as minimum guaranteed throughput thresholds, etc.) and/or administrative-based attributes (e.g., subscription level; automated alert notification parameters, etc.) that are utilized in the configuration of the key delivery system disclosed herein. Further examples of subscription attributes may include subscriber-based attributes that involve subscriber imposed permissions and/or restrictions directed to message encryption and key handling that allow a subscriber to customize its subscription to the key delivery system.

Additionally, the term "contemporaneous" means with a short defined period of time before (e.g., less than a few seconds), concurrent with (i.e., at least partially overlapping in time) or within a short defined period of time after a particular event has occurred.

Lastly, the terms "or" and "and/or" as used herein are to be interpreted as inclusive or meaning any one or any combination. Therefore, "A, B or C" or "A, B and/or C" may mean any of the following: "A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and is not intended to limit the invention to the specific embodiments shown and described.

II. Localized Implementations

A. General Architecture

Referring to FIG. 1A, an exemplary embodiment of the general architecture of a key delivery system utilizing a first cryptographic key within a first communication session is shown in accordance with some embodiments. Herein, the key delivery system 100 includes a token authority server 102 communicatively coupled to a token-key exchange management (TKEM) system 104. In some embodiments, the TKEM system 104 may be deployed as a as part of a cloud computing network, which may be private or public.

According to one generalized embodiment of the disclosure, a first network device 106 is configured to initiate a first cryptographically secure communication session with a second network device 108. Additionally, the first network device 106 is configured to initiate a communication with the token authority server 102, which, following authentication, issues a first token (T1) to the first network device 106. It is contemplated that the token authority server 102 may use the OAuth2 standard for access delegation. Before the token authority server 102 issues a token, the first network device 106 may be configured to send an OAuth2 request to the token authority server 102. The token authority server 102 grants access to the first network device 106 and/or other known servers in the key exchange network. OAuth2 is used to allow users to access information without providing their credentials (described below), where OAuth2 is used by many companies to allow users to share information with third party applications or websites. Hence, the token authority server 102 grants "secure delegated access" to server resources on behalf of a resource owner, and thus, in working with Hypertext Transfer Protocol (HTTP) communications, OAuth2 allows tokens to be issued to third-party clients by an authorization server with the approval of the resource owner. Both the first network device 106 and the second network device 108 are registered devices for subscribers to the key delivery system 100.

Figure 1B:
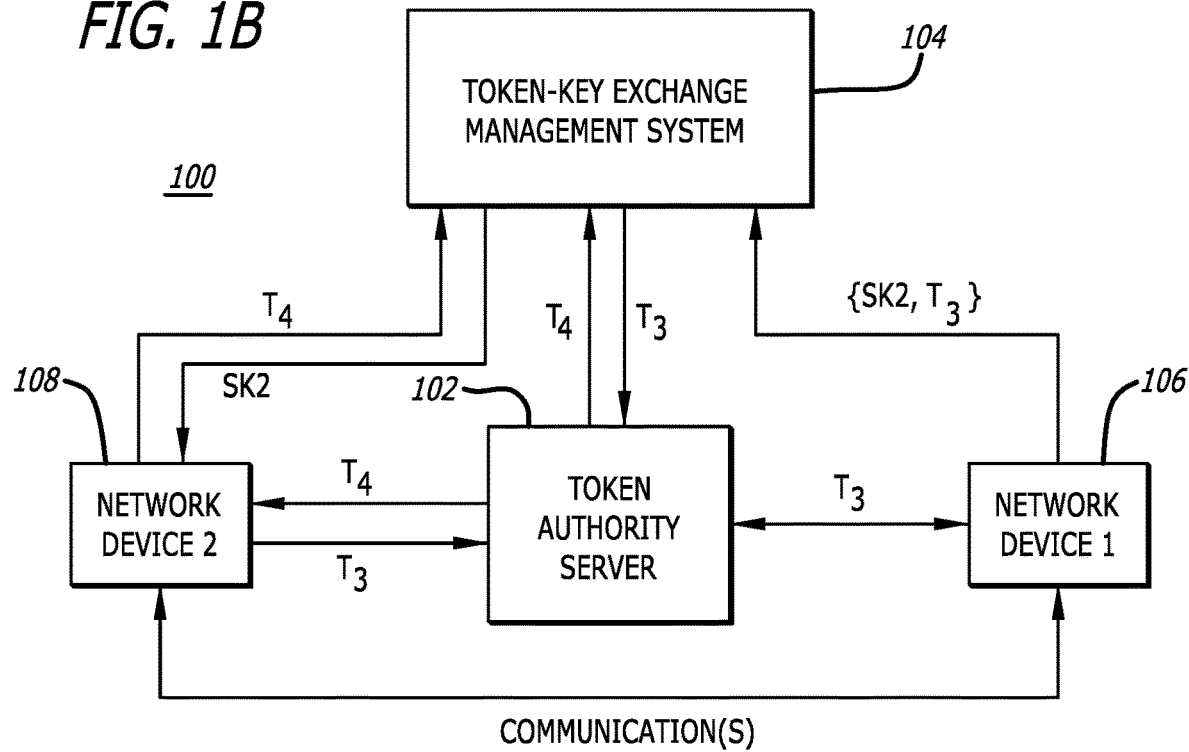
FIG. 1B is an exemplary embodiment of the general architecture of the key delivery system of FIG. 1A utilizing a second cryptographic key within the first communication session in accordance with some embodiments.

Contemporaneously with conducting the secure transmission, the first network device 106 may transmit a first cryptographic key (SK1) along with a token to the TKEM system 104 as, for example, a key value pair. In some embodiments, the first network device 106 may generate the first cryptographic key (SK1); however, in other embodiments, the first cryptographic key (SK1) may be pre-generated and stored in a secure location that is accessible to the first network device 106. Upon use by the first network device 106, the first cryptographic key (SK1) may be deleted from storage for security purposes. The term "contemporaneously" may mean any of: prior to; simultaneously with; or immediately following. The first cryptographic key (SK1) is used to encrypt content within the secure transmission. According to one embodiment of the disclosure, the first cryptographic key (SK1) may be a Scalable One-Time Pad (S-OTP). Herein, a "token" includes a plurality of alphanumeric characters of a variable length for use in locating the first cryptographic key (SK1) being used to encrypt/decrypt content contained within the secure transmission between the first network device 106 and the second network device 108. The secure transmission may be a single message (e.g., an email message, a text (SMS) message, etc.) or may be a series (two or more) of related messages such as a plurality of VoIP messages associated with an on-going communication session, i.e., wherein data may be securely exchanged between the network devices 106 and 108 in both directions. The illustration of "communication(s)" in FIGS. 1A-1B includes any combination of data transmitted between the first network device 106 and the second network device 108. Additionally, the illustration of "communication(s)" in FIGS. 1A-1B includes communications either in-band or out-of-band. As shown in the example of FIGS. 1A-1B, the network device 106 and 108 may communicate via a peer-to-peer network.

In some instances, the communication session established between the first network device 106 and the second network device 108 may rely on a single key for encryption purposes until the termination of the communication session, as described in U.S. application Ser. No. 16/129,698 entitled "System and Method for Securely Transmitting Non-PKI Encrypted Messages," filed Sep. 12, 2018, the entire contents of which are incorporated by reference herein. However, in other embodiments, a plurality of keys may be relied upon for encryption of content during a single communication session. In particular, embodiments of the key delivery system 100 discussed below will primarily provide further detail regarding reliance on a plurality of keys during a single communication session.

With continued reference to FIG. 1A and as mentioned above, the key delivery system 100 may feature a double-blind configuration in which none of the components forming the key delivery system stores identifying information directed to the sending network device, one or more targeted receiving network devices, and the intermediary network devices (e.g., token authority server, relay servers, etc.). In order to accomplish the double-blind configuration, the first network device 106 generates one or more key value pairs (KVPs). In some embodiments, a single KVP is generated that includes the token (T1) and the first cryptographic key (SK1). However, in other embodiments, as will be discussed in further detail below, the first cryptographic key (SK1) may be separated in a plurality of key fragments, e.g., "M" key segments (K1 . . . KM, wherein M≥2). Upon receiving the one or more KVPs, the TKEM system 104 initiates communications with the token authority server 102 in efforts to obtain a substitute token (hereinafter, a "second token" (T2) for the token (T1)). When requested, this communication for a substitute token (T2), in the form of a token change request message, is conducted to further obfuscate the first cryptographic key (SK10 (or key segments forming the first cryptographic key (SK1)) from the first network device 106. Responsive to receipt of the token change request message from an authenticated relay server, the token authority server generates (or causes the generation of) a second token (T2). Data identifying the relationship between the first token (T1) and the second token (T2) is stored in ephemeral memory (token data store) accessible to the token authority server 102. The TKEM system 104 then overwrites the first token (T1) with the second token (T2) so that subsequent queries for a particular cryptographic key require designation of the second token (T2) in lieu of the first token (T1).

Referring now to data transmitted by the first network device 106 to the second network device 108 ("communication(s)"), such data includes at least the token (T1) and, optionally in a single transmission (or a separate transmission), content encrypted with the first cryptographic key (SK1). Further, the "communication(s)" may represent a continuous stream of data, such as a video chat session. Upon receipt of the transmission, the second network device 108 authenticates with the token authority server 102 in the same manner as discussed above with respect to the first network device 106 (if such has not previously occurred). Following authentication, the second network device 108 performs a token-lookup by providing the token authority server 102 with the token (T1) and, in response, receives the token (T2). The token (T2) is then transmitted to the TKEM system 104 as part of one or more key request messages (or key segment request messages) for the first cryptographic key (SK1) (or key segments representing the first cryptographic key (SK1)). Upon receiving the first cryptographic key (SK1) from the TKEM system 104, the second network device 108 may decrypt encrypted content received from the first network device 106. Additionally, the second network device 108 may then send content encrypted with first cryptographic key (SK1) to the first network device 106 within the same communication session.

Referring now to FIG. 1B, an exemplary embodiment of the general architecture of the key delivery system of FIG. 1A utilizing a second cryptographic key within the first communication session is shown in accordance with some embodiments. In some embodiments, the network devices 106 and 108 continue to exchange content encrypted with the first cryptographic key (SK1) within the first communication session, and following a triggering event, the network devices 106 and 108 begin utilizing a second cryptographic key (SK2) to encrypt/decrypt content transmitted within the first communication session. Examples of a triggering event may include, but are not limited or restricted to, expiration of a time limit, transmission of a threshold amount of data, transmission of a threshold number of messages, transmission of a threshold number of data frames, etc. Specifically, prior to the triggering event, either network device 106 or 108 may perform operations to initiate implementation of the second cryptographic key (SK2) similar to the operations discussed above with respect to the implementation of the first cryptographic key (SK1).

For instance and assuming the first network device 106 performs the operations to initiate implementation of the second cryptographic key (SK2), although the second network device 108 may equally perform such operations, the first network device 106 may initiate a communication with the token authority server 102 to obtain a new, third token (T3), generate the second cryptographic key (SK2), generate one or more KVPs that include the second cryptographic key (SK2) (or key fragments) and the token (T3), and transmit the one or more KVP(s) to the TKEM system 104. Similarly as discussed above, the TKEM system 104 may initiate communications with the token authority server 102 in efforts to obtain a substitute token (hereinafter, a "fourth token" (T4) for the token (T3)).

In some embodiments, attributes of the second cryptographic key (SK2) vary from attributes of the first cryptographic key (SK1). More specifically, the generation of a cryptographic key depends on a plurality of variables, one being a selected encryption strength represented by a key length setting. One technical advantage offered by the disclosed invention is the ability to vary the attributes utilized during generation of cryptographic keys used within a single communication session. Thus, in addition to changing cryptographic keys within the communication session in response to predetermined or otherwise agreed upon triggering events, the encryption strength of the cryptographic keys may differ from one another. For instance, the variation in cipher strength or key length of each cryptographic key may be selected via user input or be predetermined and set forth in configuration file accessible to a network device or other component performing the key generation (e.g., subscription attributes). The switching of cryptographic keys at agreed upon time instances wherein the key strength may be varied among the cryptographic keys during a single communication session may be referred to as key strength modulation. In one specific embodiment, for a single communication session, the cryptographic key may be switched at a predetermined interval and the key strength may be modulated (e.g., varying in strength from 512 bits to 1024 bits to 2048 bits and back to 1024 bits and to 512 bits in an iterative manner). However, the key strength is not limited to the above-recited example but may instead vary in any pattern, or randomly, during the duration of the communication session as the cryptographic key in use changes. In one embodiment, the key strength may vary, or modulate, from 512 bits to 131,072 bits.

It should be noted that the operations to initiate implementation of additional cryptographic keys may be an iterative process such that the network devices 106 and 108 change cryptographic keys one or more times during a single communication session. Importantly, the invention disclosed herein implements the change of cryptographic keys without requiring the network devices 106 and 108 to establish a new communication session. As referenced above, it is common today for communication sessions to span extended periods of time (e.g., video chat sessions, instant messaging sessions, etc.) and currently utilize a single cryptographic key for the duration of the session. This provides opportunity (e.g., time) for attackers to compromise the encryption scheme. As a specific technical advantage, the key delivery system 100 provides for reliable and secure transmission of a plurality of symmetric keys having modulating key strength within a single communication session without disruption to the users/network devices.

Figure 2:
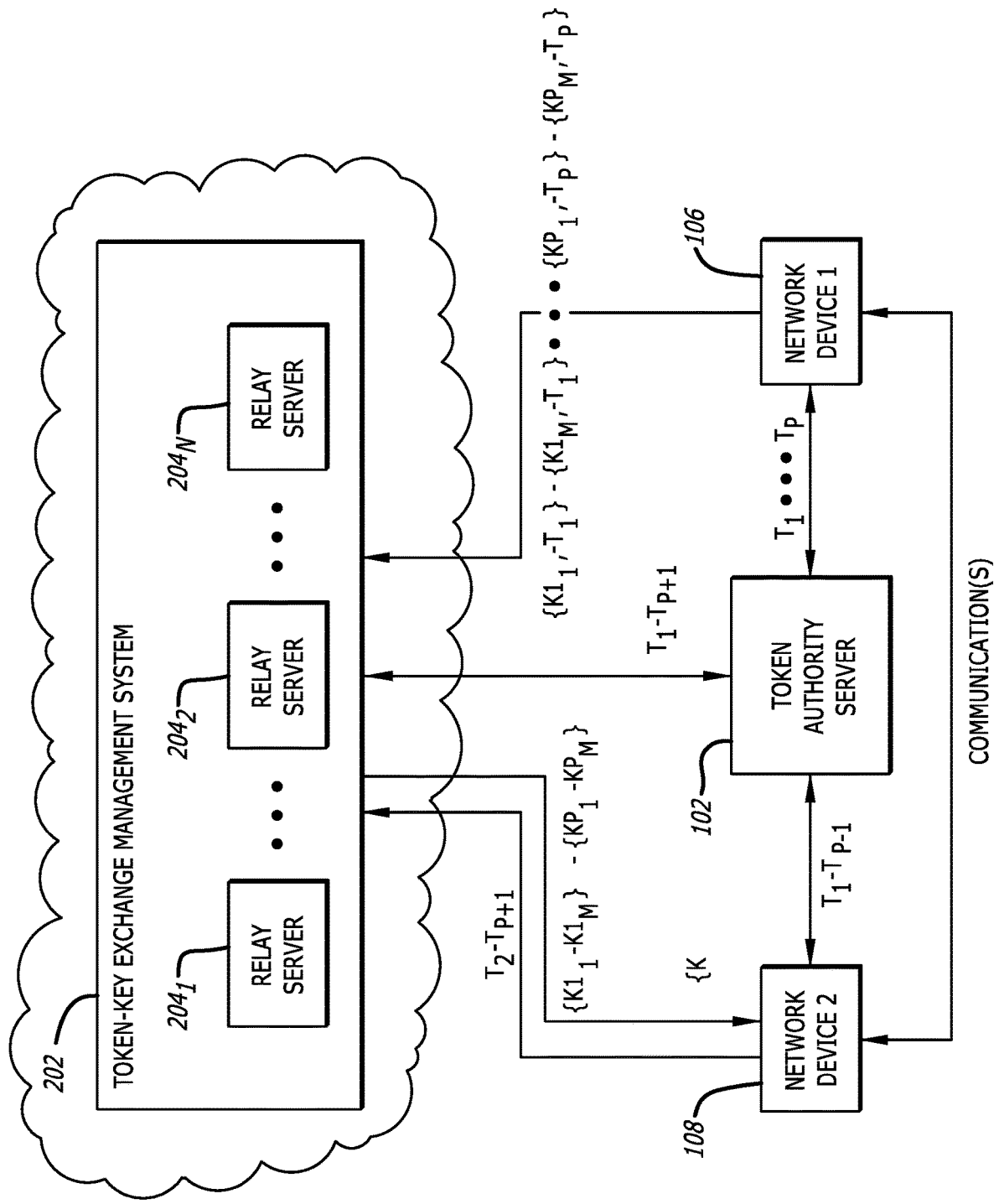
FIG. 2 is an embodiment of the token-key exchange management (TKEM) system of FIGS. 1A-1B including a plurality of relay servers in accordance with some embodiments.

Referring now to FIG. 2, a key delivery system 200 including a TKEM system 202 comprised of a plurality of relay servers $204_1$-$204_N$ and deployed as part of a cloud network is shown in accordance with some embodiments. The TKEM system 202 may be one implementation of the TKEM system 104 discussed in FIGS. 1A-1B, wherein the TKEM system 202 is a virtual electronic device including software that virtualizes at least a portion of the functionality of a physical electronic device. The relay servers $204_1$-$204_N$ may represent individual virtual electronic devices also deployed within the cloud network. The cloud network may include a public cloud network such as Amazon Web Services® (AWS), Microsoft® Azure®, Google® Cloud, or the like. By utilization of a public cloud network, each of the relay servers $204_1$-$204_N$ may be positioned at geographically distant locations to reduce the chances of a cryptographic key being compromised through an attack directed to one of the relay servers $204_1$-$204_N$. Also, the token authority server 102 may comprise logic present in the public cloud network. Alternatively, the cloud network may be deployed as a virtual private network, provided the token authority server 102 and the relay servers $204_1$-$204_N$ are deployed as part of the virtual private network.

The key delivery system 200 may operate in a similar manner as the key delivery system 100 of FIGS. 1A-1B. However, in addition, the first network device 106 operating within the key delivery system 200 may be configured to logically relate different portions of cryptographic keys (e.g., SK1-SKP, wherein P≥2), such as a Scalable One-Time Pads (S-OTPs) for example, with the tokens (T1-TP) to form key value pairs. As described below, the key value pairs may be produced to securely associate a token that may be used as a lookup parameter, with different portions of the first cryptographic key (SK1) (referred to as "key segments"). In particular, by separating the first cryptographic key (SK1) into "M" key segments (K1$_1$ ... K1$_M$) (N≥M≥2) and pairing each of the different key segment with a token, e.g., the token (T1), "M" different key value pairs (KVPs) may be generated.

According to one embodiment of the disclosure, the first network device 106 is configured to transmit multiple KVPs to different relay servers (e.g., relay servers 204$_1$-204$_N$) within the TKEM system 202 contemporaneously with the particular transmission 116. The selection of the relay servers 204$_1$-204$_N$ may be conducted in accordance with a random or pseudo-random selection process.

According to one embodiment of the disclosure, each of the relay servers 204$_1$-204$_N$ may be a virtualized server that supports communications with one or more network devices. For example, the relay server 204$_1$ may operate as a virtual email server that is part of an email platform offered by the cloud network (e.g., EC2 server nodes for AWS cloud network). As described below and illustrated in FIGS. 5A-5G, each of the selected relay servers 204$_1$ ... 204$_N$ may be configured to (a) receive a KVP, each including a corresponding key segment and the token (T1), from the first network device 106 being a subscriber to the key delivery system 200, (b) reposition the KVP to obfuscate their location from the first network device 106, (c) modify the token (T1) within that KVP to further obfuscate its location from the first network device 106, and/or (d) return the stored key segment in response to a key segment request message.

Additionally, FIG. 2 generally illustrates the ability of the key delivery system 200 to utilize a plurality of cryptographic keys during a single communication established between the first network device 106 and the second network device 108 as discussed above with respect to FIGS. 1A-1B. Specifically, FIG. 2 illustrates the transmission of a series of KVPs including: (1) the KVPs {K1$_1$, T1}-{K1$_M$, T1} that pertain to a first cryptographic key; and (2) the KVPs {KP$_1$, TP}-{KP$_M$, TP} that pertain to a P$^{th}$ cryptographic key (wherein P≥2). Similarly, FIG. 2 illustrates communications between the TKEM system 202 and the token authority server 102 in which tokens (T1 through TP+1) are exchanged. Further, FIG. 2 illustrates the exchange of tokens (T1 through TP+1) between the second network device 108 and the token authority server 102; the transmission of tokens (T1 through TP+1) from the second network device 108 to the TKEM system 202 in exchange for the key segments {K1$_1$-K1$_M$}-{KP$_1$-KP$_M$}. Further explanation as to the operations of the relay servers 204$_1$-204$_N$ is provided below at least with respect to FIGS. 5A-5G.

Figure 3:
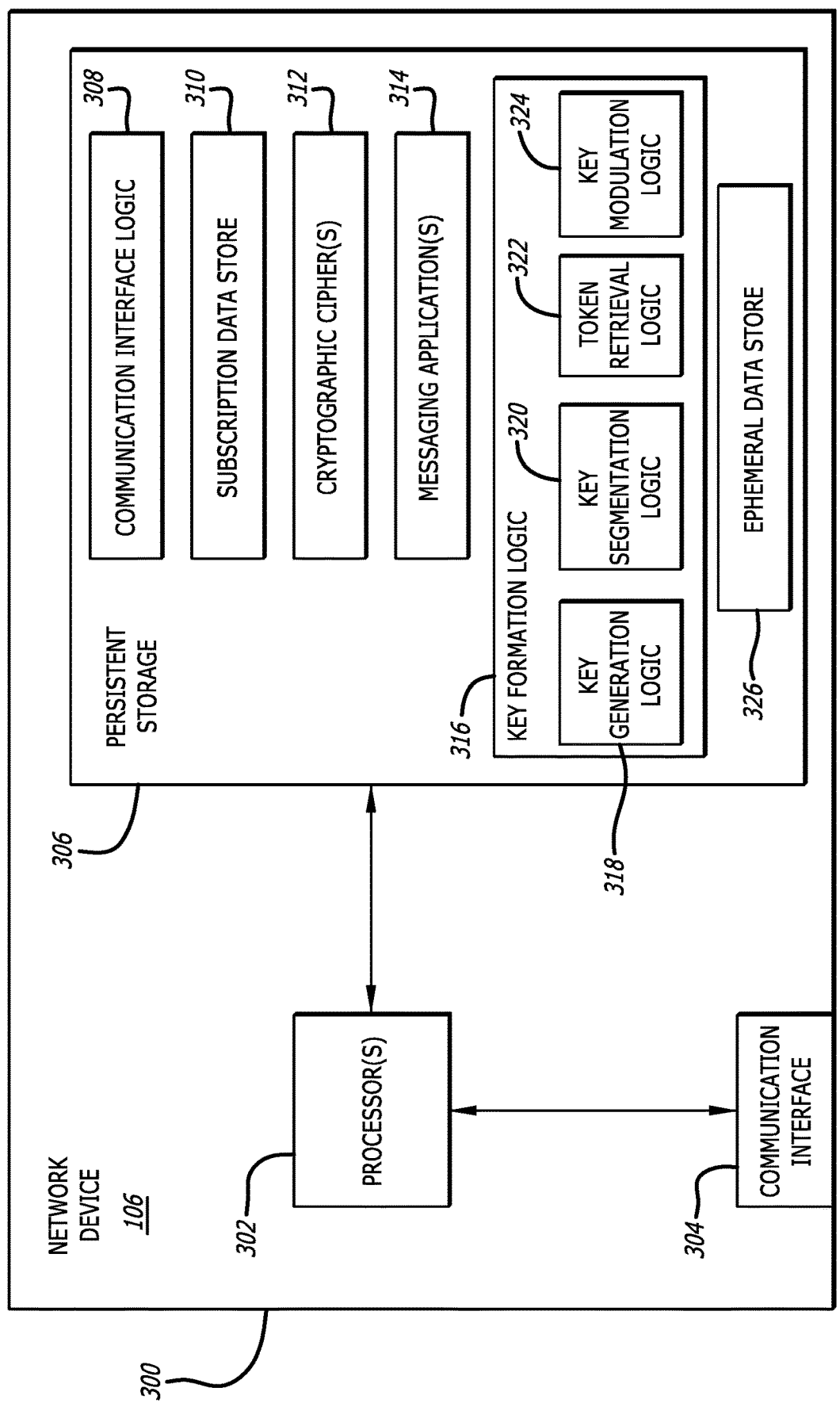
FIG. 3 is an exemplary block diagram of the general architecture of a network device deployed within the key delivery system of FIGS. 1A-1B in accordance with some embodiments.

Referring now to FIG. 3, an exemplary block diagram of the general architecture of a network device granted access to the key delivery system 100 of FIGS. 1A-1B or the key delivery system 200 of FIG. 2 (e.g., the first network device 106 or the second network device 108) is shown. For clarity, the key delivery system 100 and the network device 106 will be discussed herein but the disclosure applies equally to the key delivery system 200 and the network device 108, respectively. The network device 106 includes a plurality of components including, but not limited or restricted to the following: one or more processors 302 (for purposes of clarity, "a processor"), a network interface 304, and/or a persistent storage 306 (e.g., non-transitory computer-readable medium). As shown, when deployed as a physical device, the components may be at least partially encased in a housing 300 made entirely or partially of a rigid material (e.g., hardened plastic, metal, glass, composite, or any combination thereof) to protect these components from environmental conditions. As a virtual device, however, the network device 106 is directed to the functionality associated with some or all of the logic within the memory 306.

The processor 302 may be implemented as a multi-purpose, programmable component that accepts digital data as input, processes the input data according to stored instructions, and provides results as output. One example of the processor 302 may include a central processing unit (CPU) with a corresponding instruction set architecture. Alternatively, the processor 302 may include a digital signal processor (DSP), an Application Specific Integrated Circuit (ASIC), a field-programmable gate array (FPGA), a microcontroller, or any other electronic circuitry that is configured to support data processing.

As shown in FIG. 3, the processor 302 is communicatively coupled to the memory 306 (e.g., a non-transitory, computer-readable medium) via a transmission medium. According to one embodiment of the disclosure, the memory 306 may be configured to include any combination of the following logic components: (i) communication interface logic 308; (ii) a subscription data store 310; (iii) one or more cryptographic ciphers 312 (e.g., a cryptographic cipher or cipher suite); (iv) one or more messaging applications 314; (v) key formation logic 316 including key generation logic 318, key segmentation logic 320, token retrieval logic 322, and/or key modulation logic 324; and/or (vi) an ephemeral data store 326.

Herein, the subscription data store 310 is configured to maintain credentials associated with the network device 106. According to one embodiment of the disclosure, the credentials may include a subscriber identifier that may be requested for submission by the token authority server 102 to confirm that the network device 106 is authorized to use the services provided by the key delivery system 100. As described below, the credentials may be routed to an identity management system to confirm that the network device 106 is associated with an active subscriber to the key delivery system 100 before any token (or tokens) are issued by the token authority server 102 of FIGS. 1A-1B. Besides the credentials, the subscription data store 310 may include attributes assigned to the network device 106 and its users. Alternatively, OAuth2 communications may be utilized in lieu of the submission of credentials.

Herein, subscription attributes may include performance-based attributes, administrative-based attributes, and/or subscriber-configured attributes. The performance-based attributes may be used to adjust the operability and/or strength (resiliency) of a selected cryptographic cipher of the stored cryptographic cipher(s) 312 for transmissions governed by a selected messaging application of the stored messaging application(s) 314. For example, the performance-based attributes may specify (a) key length setting, and/or (b) a key separation value (M) representing the number of segmentations performed on the first cryptographic key (SK1) prior to uploading "M" key segments to relay servers in the cloud network.

The subscriber-configured attributes may be used by a subscriber to customize its subscription by providing certain permissions and/or imposing certain restrictions directed to message encryption. For instance, certain targeted destinations may be selected to use specific cryptographic ciphers of the stored cryptographic ciphers 312 (and specific key lengths) to enhance security directed to those destinations. For instance, transmissions directed to certain governmental agencies (e.g., Department of Defense, Department of Justice, etc.) may require more heightened security than other message destinations (e.g., particular approved cipher, set minimal key length, etc.). Similar attributes may be used to reduce security. Hence, the subscriber-configured attributes may provide centralized control of cipher and/or key length selection to ensure compliance with security requirements that may vary among different vendors, suppliers, and customers.

The cryptographic cipher(s) 312 correspond to one or more ciphers for use in encrypting content within a particular transmission and recovering the content in non-encrypted format. The cryptographic cipher(s) 312 may include a single cryptographic cipher or a cipher suite including multiple ciphers that provides flexibility in the use of certain ciphers based on subscriber preference, customer preference, or geographic regulations.

The key formation logic 316 includes key generation logic 318, key segmentation logic 320, token retrieval logic 322 and key modulation logic 324. For key delivery, the key generation logic 318 is configured to generate cryptographic keys, such as the first cryptographic key (SK1) and the second cryptographic key (SK2) of FIGS. 1A-1B. One of the cryptographic cipher(s) 312 may use the first cryptographic key (SK1) to encrypt content being output from the network device 106 for transmission over a network.

The key segmentation logic 320, when included in configurations such as seen in FIG. 2, based on the key separation value (M) being a subscription attribute, controls the formation of "M" KVPs. More specifically, the key segmentation logic 320 may initiate a token request message to obtain a token (e.g., token (T1)) for temporary storage in ephemeral data store 326 and use in key delivery to another network device. Additionally, the key segmentation logic 320 is configured to separate the first cryptographic key (SK1), which is stored in ephemeral memory operating as the ephemeral data store 326, into "M" key segments according to the above-described key separation value. Therefore, the key segmentation logic 320 is configured to generate the KVPs by pairing each of the respective key segments with the received token (T1).

For key recovery, when the network device 106 is operating to decrypt incoming, encrypted content within a message from another subscriber network device, the token retrieval logic 322 controls token retrieval from the token authority server 102. Based on the retrieved token, the key formation logic 316 receives key segments associated with the retrieved token to recover a first cryptographic key (SK1), which may be subsequently stored in the ephemeral data store 326 for decryption operations.

The key modulation logic 324 is configured to affect the key generation process performed by the network device 106 by, for example, dictating the key length of each cryptographic key generated during a communication session. Thus, the key modulation logic 324 controls the modulation aspect of the cryptographic keys. For example, the key modulation logic 324 may provide the key generation logic 318 input corresponding to a specified size of a key modulus in bits, e.g., 512 bits, 1024 bits, etc. The key modulation logic 324 may maintain a recording of all key strengths utilized during the communication, which enables the key modulation logic 324 to instruct the key generation logic 318 to form a plurality of keys having strengths that, over time, resemble a "waveform" shape, e.g., increasing and decreasing over time in a particular pattern during a single communication session. The key modulation logic 324 may provide the key generation logic 318 with a specific key size for each cryptographic key to be generated according to a randomized manner, a predetermined pattern, received user input and/or according to subscriber-attributes.

Figure 4:
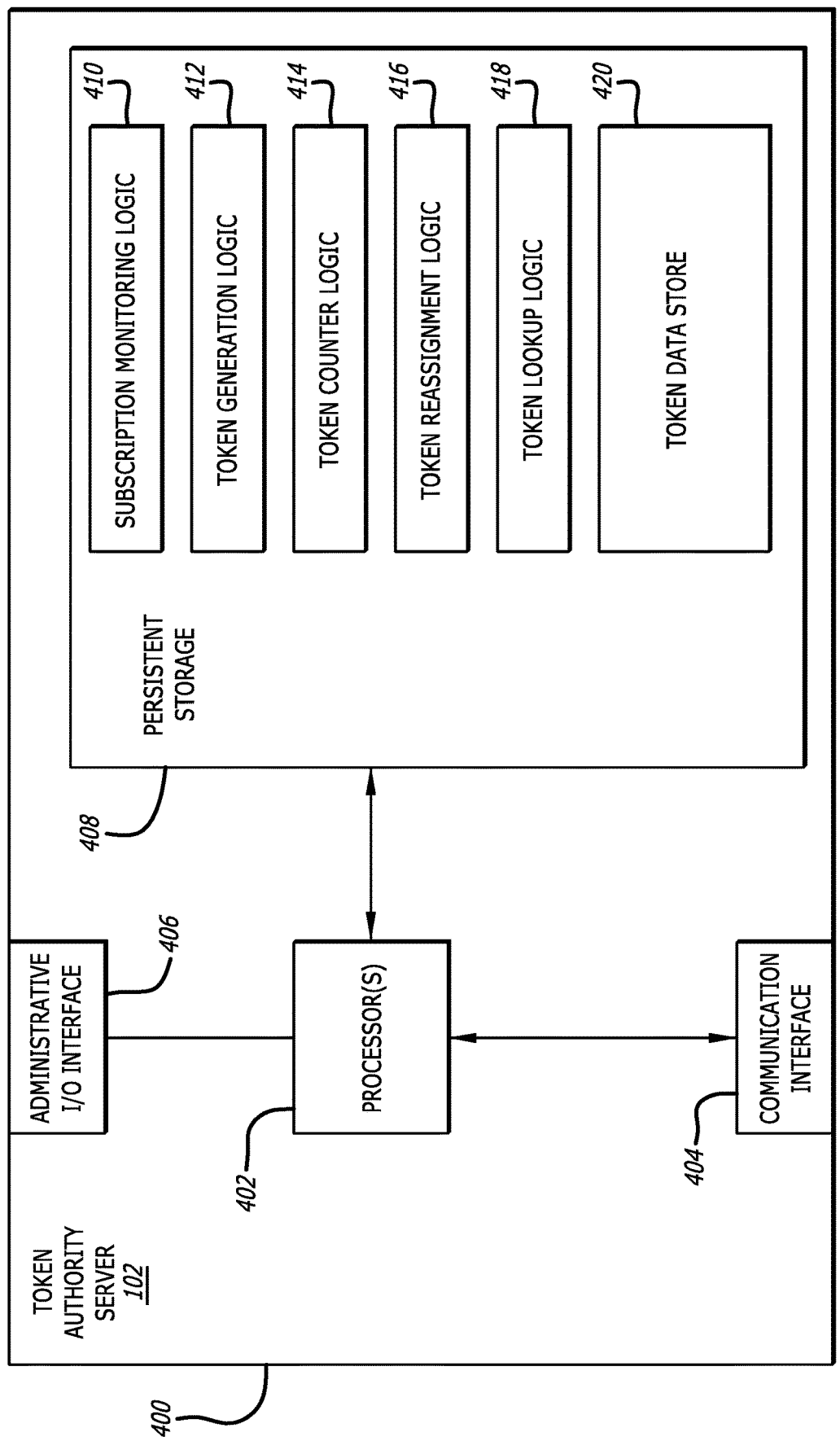
FIG. 4 is an exemplary block diagram of the general architecture of a token authority server deployed within the key delivery system of FIGS. 1A-1B in accordance with some embodiments.

Referring to FIG. 4, an exemplary block diagram of the general architecture of the token authority server 102 deployed within the key delivery system 100 of FIGS. 1A-1B or the key delivery system 200 of FIG. 2 is shown. For purposes of clarity, the key delivery system 100 will be discussed herein but the disclosure applies equally to the key delivery system 200. Herein, the token authority server 102 includes a plurality of components that may include, but are not limited or restricted to a processor 402, a network interface 404, a memory 408, and/or an administrative (I/O) interface 406 being an interface for downloaded updates (e.g., software updates for logic stored in memory 408) and uploaded accounting information (e.g., token counts per subscriber, network device, etc.). The components are communicatively coupled together via a transmission medium. As shown, when the token authority server 102 is deployed as a physical device, the components may be at least partially encased in a housing 400. However, as a virtual device, the token authority server 102 is directed to the functionality associated with some or all of the logic within the memory 408.

The processor 402 is a multi-purpose, programmable component that accepts digital data as input, processes the input data according to stored instructions, and provides results as output, as described above. Communicatively coupled to the processor 402, the memory 408 may be configured to include (i) a subscription monitoring logic 410; (ii) token generation logic 412; (iii) token counter logic 414; (iv) token reassignment logic 416; (v) token lookup logic 418, and (vi) token data store 420.

Herein, the subscription monitoring logic 410 is configured to assist in the conformation that a network device requesting a token from the token authority server 102 is associated with a subscriber to the key delivery system 100 of FIGS. 1A-1B. For this embodiment of the disclosure, the subscription monitoring logic 410 is configured to receive and forward subscription information (e.g., credentials, etc.) from a particular network device (e.g., first network device 106 of FIGS. 1A-1B) for use in authenticating the particular network device (e.g., verifying an active subscription is currently held by a subscriber associated with the particular network device). The upload of the subscription information may be conducted in accordance with either a "push" or "pull" data acquisition sequence. For a "push" data acquisition sequence, the token authority server 102 receives the subscription information without any prompting. For a "pull" data acquisition sequence, the subscription information may be received in response to a query message being issued by the token authority server 102. The query message may be issued based on receipt of a token request message and a determination that an active subscription for the particular network device has not been established for over a prescribed period of time (e.g., day, week, etc.). Alternatively, the query message may be issued as a scheduled multicast or broadcast message.

In response to receipt of the token request message from the first network device 106, provided the particular network device has been authenticated, the token generation logic 412 generates a token, e.g., the token (T1) as discussed with respect to FIGS. 1A-1B, for return to the first network device 106. According to one embodiment of the disclosure, the returned token (T1) may be unique to the key delivery system 100. However, according to another embodiment of the disclosure, the token (T1) may be unique to a set of tokens stored within a token data store 420 that are currently in use. After issuance, the token counter logic 414 maintains and increases a count value associated with a subscriber requesting the token, where the count value may be subsequently upload via the administrative interface 406 to an identity management system for billing of the subscriber via debiting a pre-paid account for the subscriber. The subscriber identifier may be included as part of the token request message. The identity management system is discussed in U.S. application Ser. No. 16/129,698, the entire contents of which have been incorporated by reference herein.

The token reassignment logic 416 is configured to operate in response to a token change request message from the TKEM system 104 or from one of the relay servers of the TKEM system 200. Upon receipt of the token change request message, including the original token (T1), the token reassignment logic 416 generates a second token (T2), which is associated with the original token (T1) and stored as a corresponding token pair in an entry within a data structure (e.g., database, listed list, etc.) of the token data store 420. The token reassignment logic 416 causes return of the second token (T2) via a token change response message.

The token lookup logic 418 is configured to operate in response to a token request message from a receiving network device. In response to the token lookup message including the original token (T1), the token lookup logic 418 accesses one or more of entries within the token data store 420 using the original token (T1) as a lookup. The token lookup logic 418 generates a token lookup reply message including the second token (T2) based on extraction of the second token (T2) from an entry within a data structure within the token data store 420 including the original token (T1) and second token (T2) combination. Thereafter, the token lookup logic 418 may initiate deletion of entry within the token data store 420.

b. Key Delivery System Operations

Figure 5A:
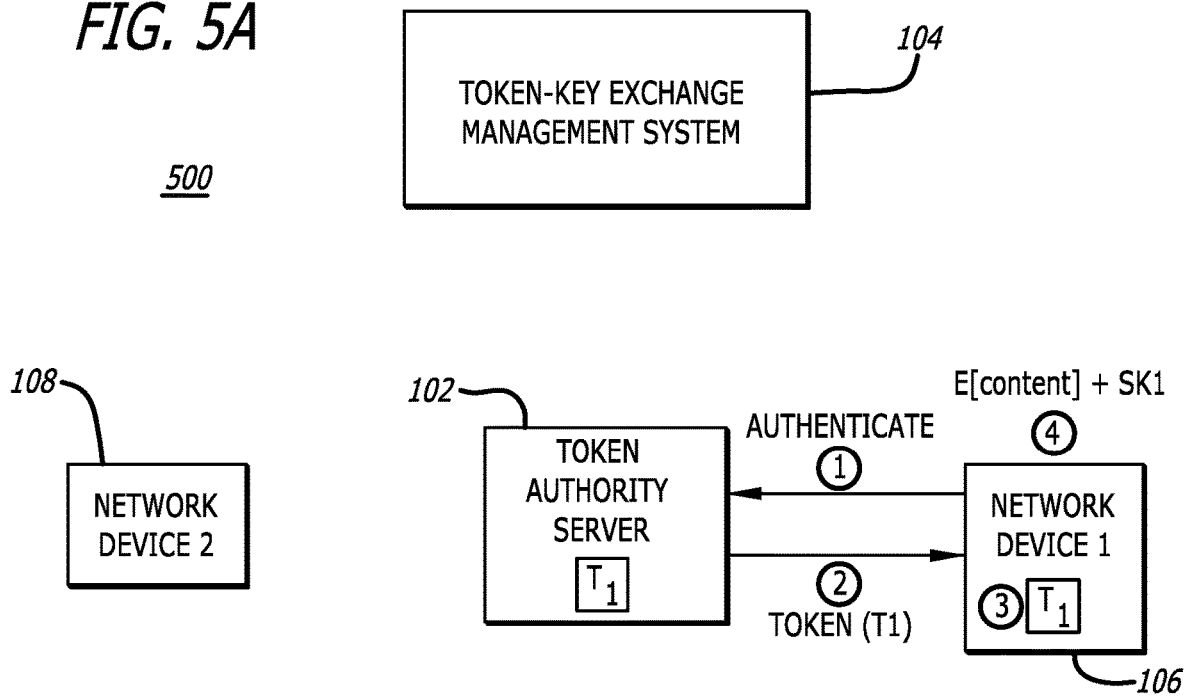
FIGS. 5A-5G are illustrations of a plurality of operations performed during a single communication session in a first embodiment in accordance with some embodiments.
Figure 5B:
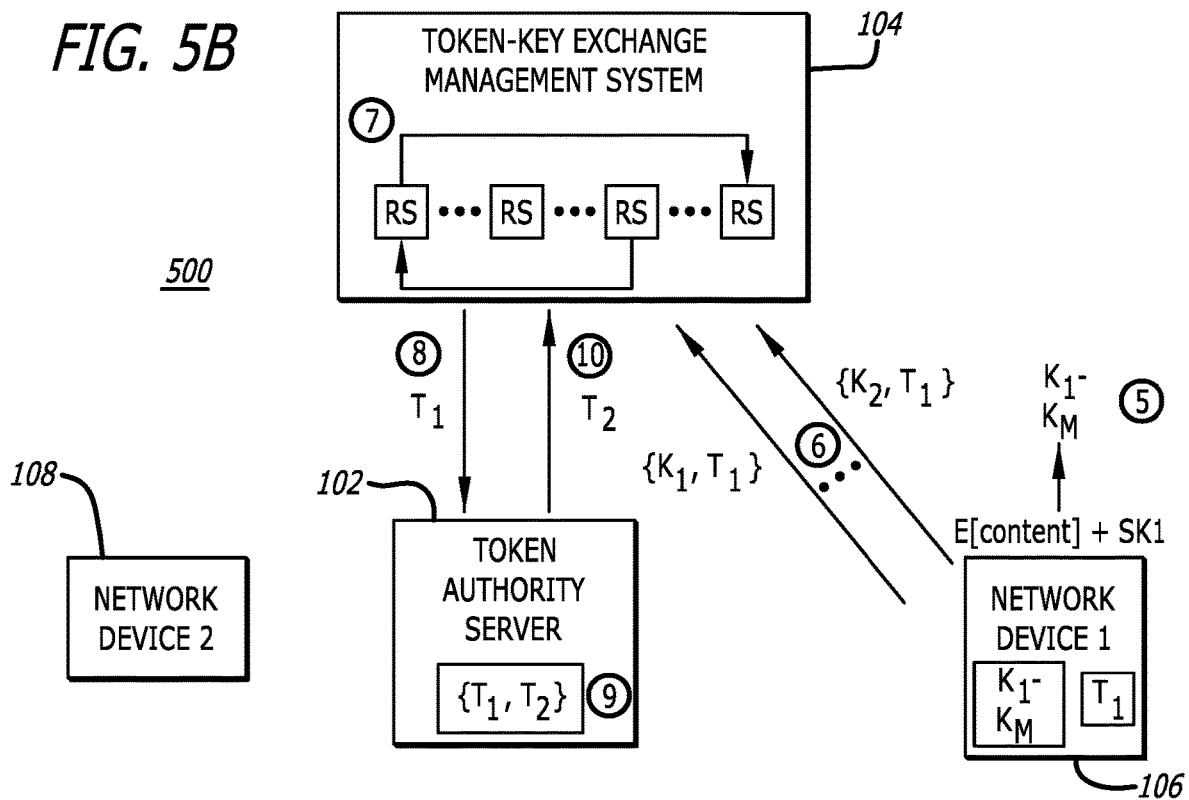
Figure 5C:
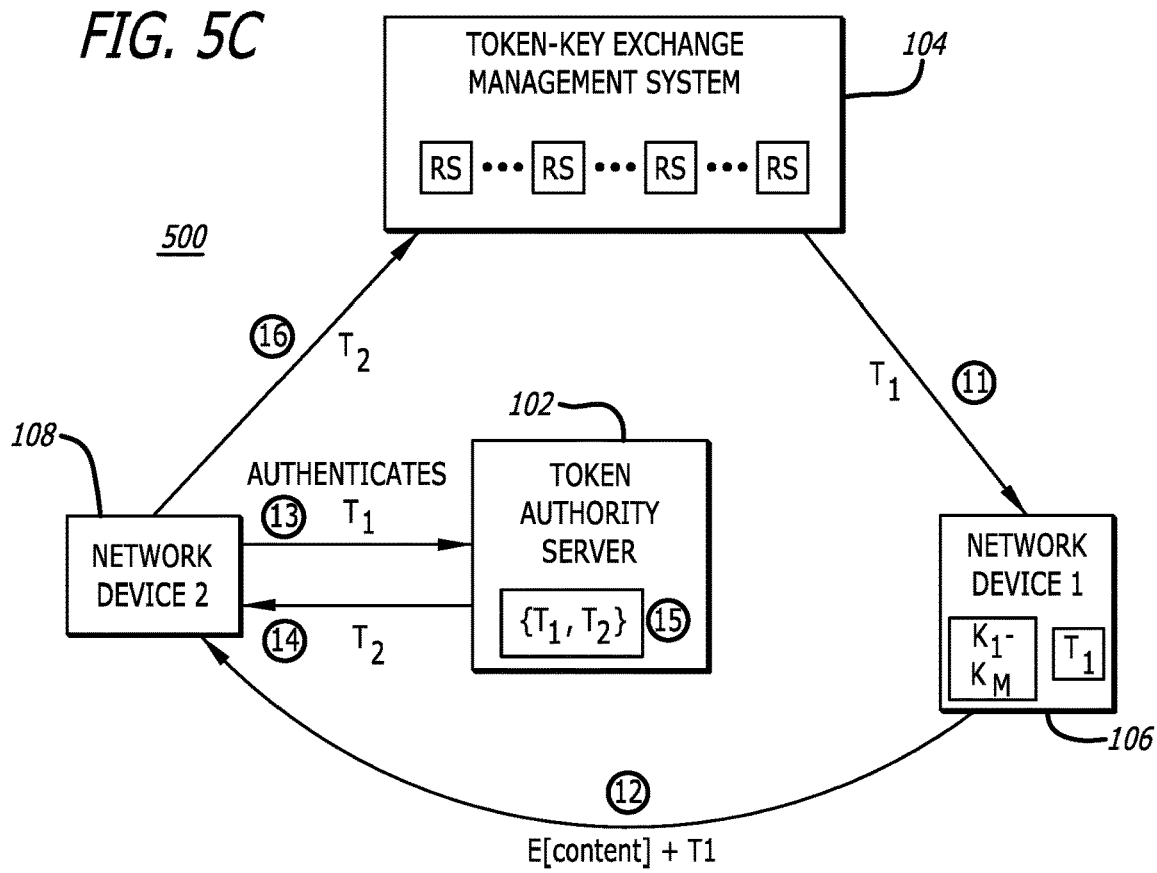
Figure 5D:
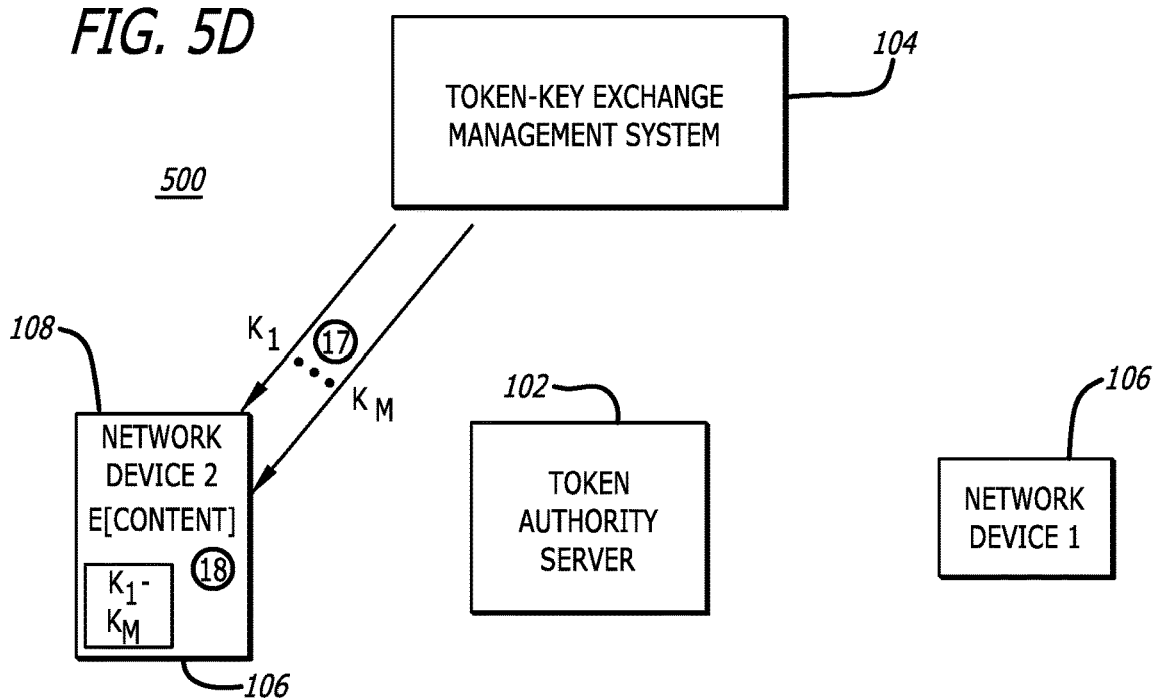
Figure 5E:
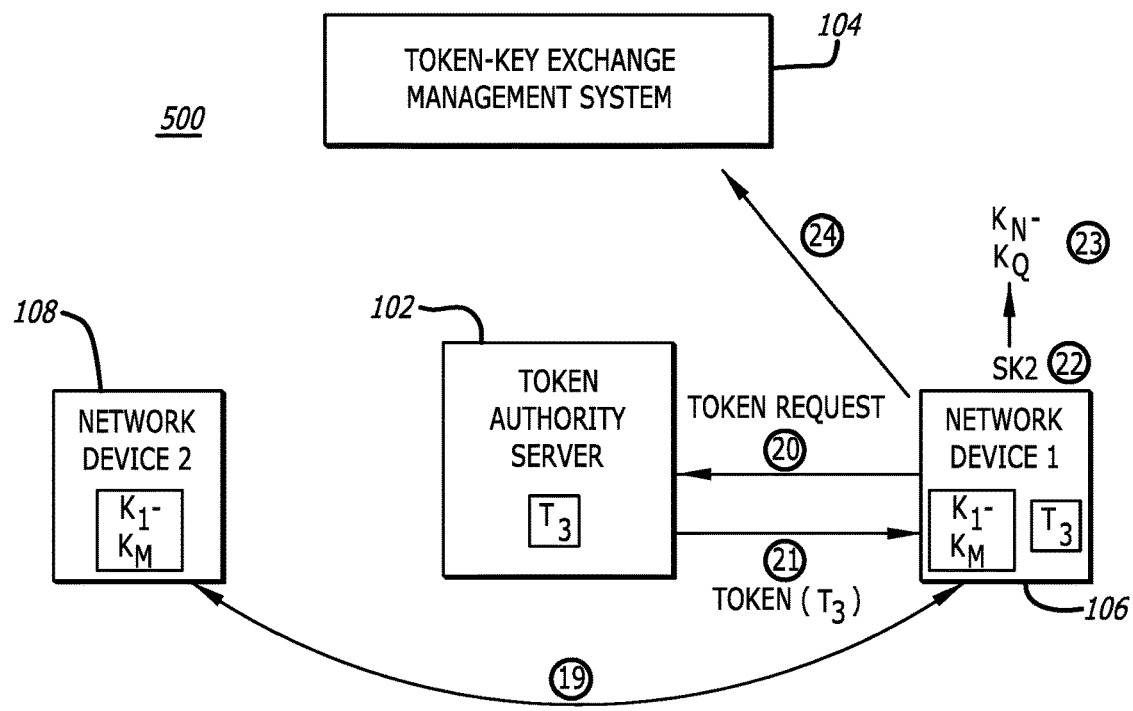
Figure 5F:
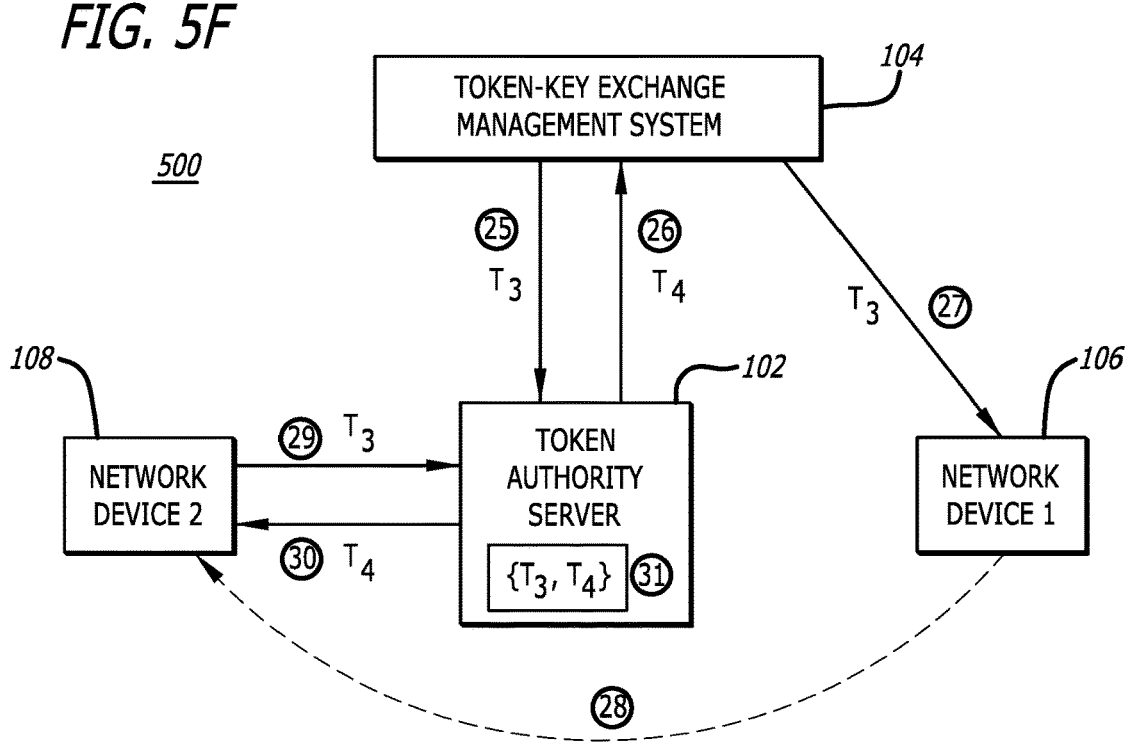
Figure 5G:
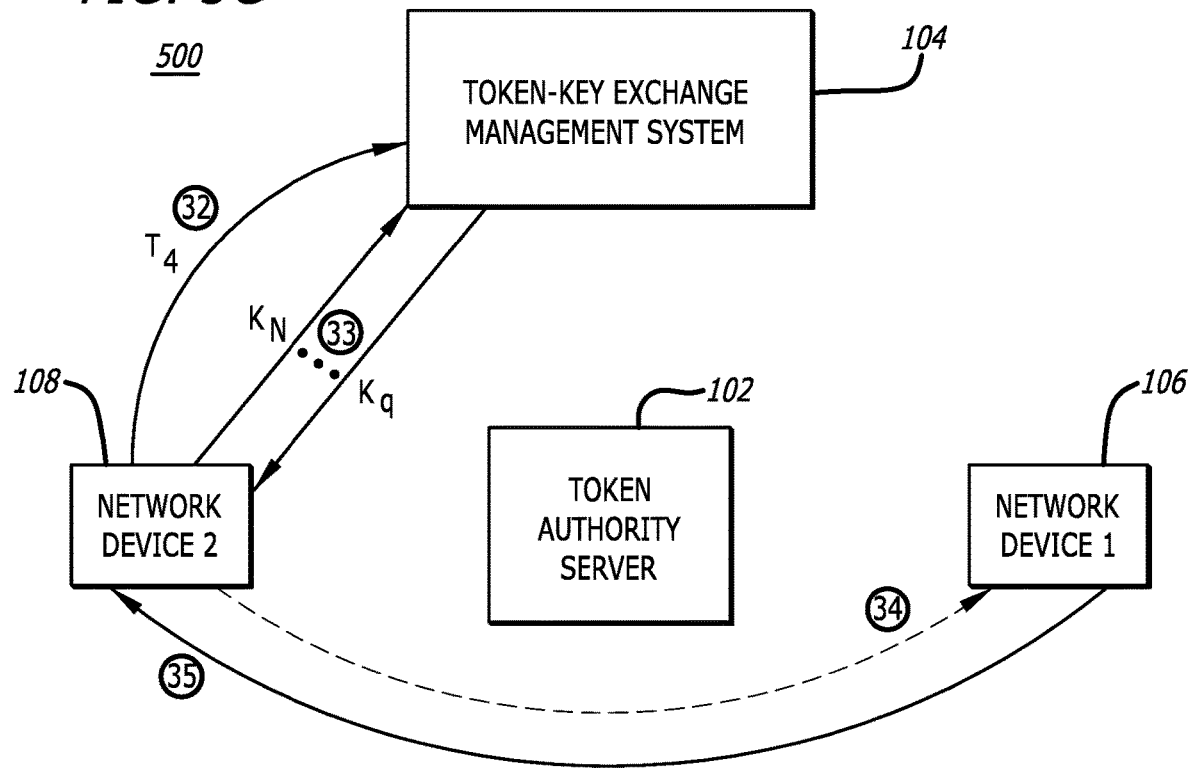

Referring to FIGS. 5A-5G, illustrations of a plurality of operations performed during a single communication session in a first embodiment are shown in accordance with some embodiments. In each of the illustrations of FIGS. 5A-5G, operations conducted by the key delivery system 500 (similar to the key delivery system 200 of FIG. 2) in implementing the utilization of a plurality of cryptographic keys to encrypt/decrypt content exchanged between the first network device 106 and the second network device 108 are shown. In particular, the operations illustrate the novel utilization of multiple cryptographic keys (SKs) within a single communication session. Herein, the key delivery system 200 features a double-blind configuration in which the second network device 108 possesses no personal information associated with the first network device 106. Further, FIGS. 5A-5D illustrate the implementation of a first cryptographic key (SK1) and FIGS. 5E-5G illustrate the implementation of a second cryptographic key (SK2).

Each of FIGS. 5A-5G includes a plurality of numerals, i.e., 1-35, with each numeral representing one or more operations performed by one or more components of the key delivery system 200 or transmission of the data within the key delivery system 200. Referring now to FIG. 5A, the first network device 106 conducts an authentication process with the token authority sever 102 (numeral 1). For instance, the first network device 106 may provide the token authority server 102 with identifying information such as biometric information of a user of the first network device 106 obtained via one or more sensors located therein. Biometric information may include any measurements or characteristics of the user's body, for example, a fingerprint reading, facial recognition, and/or iris recognition. Of course, other biometric information may be utilized as identifying and authenticating information. Additionally, textual information (e.g., user name and password) may also be utilized in the authentication process. In response to validation of the supplied identifying information, the token authority server 102 generates a first token (T1), which is in turn transmitted to the first network device 106 (numeral 2). As discussed above, the token authority server 102 stores the token (T1) in ephemeral memory. Similarly, upon receipt, the first network device 106 may store the token (T1) in ephemeral memory (numeral 3). The first network device 106 then generates a first cryptographic key (SK1) and, optionally, encrypts content (encrypted content referred to as "E[content]") (numeral 4). As referenced above, a key modulation logic stored on the first network device 106 (such as the key modulation logic 324 of FIG. 3) may dictate a particular key strength (e.g., a key size in bits).

Referring now to FIG. 5B, the first network device 106 separates the first cryptographic key (SK1) into a plurality of key fragments, e.g., "M" key segments (K1 . . . KM, wherein M≥2), and stores the key segments in ephemeral memory (numeral 5). Following the separation of the first cryptographic key (SK1) into fragments, the first network device 106 generates key value pairs (KVPs) comprising a key fragment and the token (T1). The KVPS are then transmitted to the TKEM system 104 in a plurality of transmissions (numeral 6). The TKEM system 104 is illustrated as including a plurality of relay servers (RS), such as the relay servers $204_1$-$204_N$ of FIG. 2. As further shown in FIG. 5B, the relay servers perform random (or pseudo-random) shuffling operations with retry capability to transfer the KVPs to different relay servers (numeral 7). As mentioned above, the shuffling obfuscates the location of at least the key segments (K1, K2) from the first network device 106, such that each of the KVPs is assigned to a new, but different, relay server (hereinafter, "reassigned relay servers").

Following completion of the reshuffling of the KVPs, each reassigned relay servers establishes communications with the token authority server 102 and each issue a token change request messages to the token authority server 102, wherein each token change request message includes the token (T1) and an address of the sending relay server (numeral 8). In response, the token authority server 102 generates a second token (T2) corresponding to the token (T1) and stores the tokens (T1, T2) in ephemeral memory (numeral 9). The token (T2) is then returned to the relay servers via corresponding token change response messages (numeral 10).

Referring now to FIG. 5C, following completion of the shuffling of the KVPs, the original relay servers transmit an acknowledgement of receipt of the token (T1) and that reshuffling has occurred (numeral 11). The acknowledgement communications from the original relay servers may include the token (T1); however, no indication of the reassigned relays servers is provided, thereby establishing the double-blind configuration discussed above. Following receipt of the acknowledgment communications from the original relay servers, the first network device 106 transmits encrypted content to the second network device 108 (numeral 12). In one embodiment, the transmission includes the token (T1), as illustrated. However, in alternative embodiments, the token (T1) may be provided to the second network device 108 in a separate communication, e.g., in an out-of-band communication. It may be assumed that the first network device 106 initiates a communication session with the second network device 108 either before, or at the time of, transmitting the communication of numeral 12 (or vice versa).

Upon receipt of the token (T1), the second network device 108 communicates with the token authority server 102 by transmitting a token lookup message including the token (T1) to the token authority server 102 (numeral 13). The token authority server 102 accesses its token data store, and upon determining a presence of the token (T1) therein, the token authority server 102 returns the second token (T2), corresponding to the token (T1), to the second network device 108 via a token lookup reply message (numeral 14). The token authority server 102 then purges its ephemeral memory of the tokens (T1, T2) (numeral 15). As the second network device 108 is now in possession of the token (T2), the second network device 108 transmits a key segment request message to each of the relay servers, e.g., as separate unicast messages or as a multicast message (numeral 16). The key segment request message(s) include the second token (T2).

Referring now to FIG. 5D, the relay servers are prompted to return any key segment corresponding to the second token (T2) via key segment response message(s) (numeral 17). Based on the received key segment response message(s), the second network device 108 reassembles the first cryptographic key (SK1), which enables the decryption of the received encrypted content, E[content] (numeral 18). Referring now to FIG. 5E, the network devices 106 and 108 may continue to transmit encrypted content within the communication session (numeral 19), until a triggering event, discussed further below. However, during the communication session and concurrent to the exchange of content encrypted with the first cryptographic key (SK1), the first network device 106 may begin a process to transition from utilization of the first cryptographic key (SK1) to a second cryptographic key (SK2).

Specifically, the process to transition from utilization of the first cryptographic key (SK1) to a second cryptographic key (SK2) may include many of the operations discussed above with respect to numerals 1-18. However, differently, the key delivery system 500 may be configured to alter the key generation process of the second cryptographic key (SK2) from the key generation process of the first cryptographic key (SK1). In one example, the key modulation logic stored on the first network device 106 may dictate a particular key strength (e.g., a key size in bits) that is different than key strength utilized in generating the first cryptographic key (SK1). Therefore, the key delivery system 500 is configured to, at least in some embodiments, utilize a plurality of cryptographic keys throughout a single communication session with one or more of the cryptographic keys varying in strength.

In view of the above methods for altering the key generation process of the second cryptographic key from that of the first cryptographic key, the process to transition from the first cryptographic key (SK1) to the second cryptographic key (SK2) begins when the first network device 106 issues a second token request message to the token authority server 102 (although the second network device 108 could equally perform such operations) (numeral 20). As discussed above with respect to the first cryptographic key (SK1), the token authority server 102 sends back a third token (T3) (numeral 21), and the first network device 106 generates and fragments the second cryptographic key (SK2) into "Q" key segments (K2$_1$ ... K2$_Q$) (N≥Q≥2, wherein Q may or may not equal M) in order to pair each of the different key segments K2$_1$-K2$_Q$ with the token (T3), thereby generating "Q" different key value pairs (numerals 22-23). Further, the KVPs including the key segments K2$_1$-K2$_Q$ and the token (T3) are transmitted to the relay servers of the TKEM system 104 (numeral 24). The relay servers may again perform random (or pseudo-random) shuffling operations with retry capability to transfer the KVPs to different relay servers (not shown).

Referring now to FIG. 5F, the reassigned relay servers establish communications with the token authority server 102 and each issue a token change request messages to the token authority server 102, wherein each token change request message includes the token (T3) and an address of the sending relay server (numeral 25). In response, the token authority server 102 generates a fourth token (T4) corresponding to the token (T3) and stores the tokens (T3, T4) in ephemeral memory. The token (T4) is then returned to the relay servers via corresponding token change response messages (numeral 26).

Following completion of the shuffling of the KVPs, the original relay servers transmit an acknowledgement of receipt of the token (T3) and that reshuffling has occurred (numeral 27). As discussed above, no indication of the reassigned relays servers is provided to the first network device 106. The first network device 106 then transmits a communication to the second network device 108 that indicates a proposed time, or other triggering event, at which point the network devices 106 and 108 will transition from utilization of the first cryptographic key (SK1) to the second cryptographic key (SK2) (numeral 28). In some embodiments, such a communication is provided in an out-of-band communication (e.g., indicated by a dotted line in FIG. 5F). Further, in some embodiments, the communication proposing the time or triggering event for transitioning to the second cryptographic key (SK2) ("proposal communication") may include the token (T3). In other embodiments, the token (T3) may be included in a separate communication, that may either be in-band or out-of-band. FIGS. 5A-5G illustrate an embodiment in which the token (T3) is provided with the proposal communication.

Continuing the discussion of FIG. 5F, the second network device 108 with the token authority server 102 by transmitting a token lookup message including the token (T3) to the token authority server 102 (numeral 29). The token authority server 102 accesses its token data store, and upon determining a presence of the token (T3) therein, the token authority server 102 returns the fourth token (T4), corresponding to the token (T3), to the second network device 108 via a token lookup reply message (numeral 30). The token authority server 102 then purges its ephemeral memory of the tokens (T3, T4) (numeral 31).

Referring now to FIG. 5G, as the second network device 108 is now in possession of the token (T4), the second network device 108 transmits a key segment request message to each of the relay servers, e.g., as separate unicast messages or as a multicast message (numeral 32). The key segment request message(s) include the second token (T4). In response to receiving the key segment request message(s), the relay servers are prompted to return any key segment corresponding to the second token (T4) via key segment response message(s) (numeral 33). Based on the received key segment response message(s), the second network device 108 reassembles the second cryptographic key (SK2). In response to reassembling the second cryptographic key (SK2), the network device 2 responds to the proposal communication by transmitting a return communication, e.g., via an out-of-band communication (numeral 34). The return communication may be a confirmation communication indicating the second network device 108 confirms the approved triggering event for transitioning to the second cryptographic key (SK2). For example, when the proposed triggering event is a future point in time and the second network device 108 has reassembled the second cryptographic key (SK2) prior to the occurred of the proposed time, the return communication may confirm the proposed time. Importantly, the second cryptographic key (SK2) is not provided in the return communication. However, in some instances, for example, when there is a delay in receiving the key segment corresponding to the second token (T4) that extends beyond the proposed time, the return communication denies the proposed time. It should be noted that retrieval of the key segment corresponding to the second token (T4) and reassembly of the second cryptographic key (SK2) is not a prerequisite for transitioning to utilization of the second cryptographic key (SK2) in all embodiments; however, in one embodiment, such a prerequisite may exist.

Figure 6:
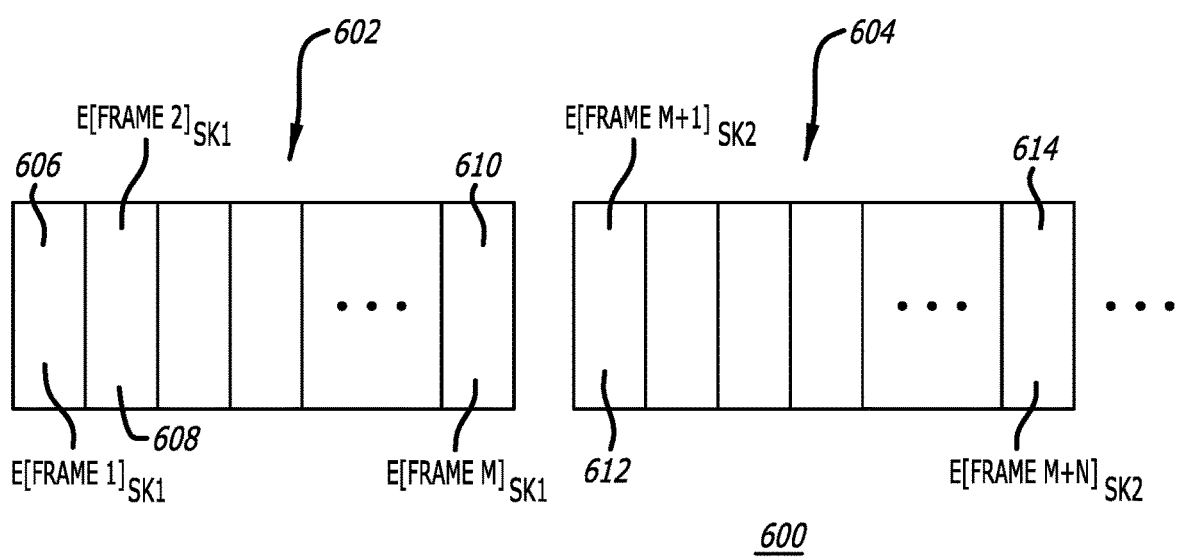
FIG. 6 is an exemplary embodiment of a plurality of encrypted frames of data within a single communication session, illustrating the use of multiple keys within the single communication session in accordance with some embodiments.

Assuming the return communication includes a confirmation of the proposed triggering event, at the occurrence of the triggering event, both network devices 106 and 108 automatically transition from utilization of the first cryptographic key (SK1) to the second cryptographic key (SK2). FIG. 5G illustrates a communication transmitted from the first network device 106 to the second network device 108 subsequent to the triggering event in which the second cryptographic key (SK2) is used to encrypt content included therein (numeral 35). As is illustrated in FIG. 6, the transition from using the first cryptographic key (SK1) to the second cryptographic key (SK2) may occur as one network device is encrypting content (e.g., video content); thus, leading to the situation in which a first data frame is encrypted with the first cryptographic key (SK1) and the immediately subsequent data frame is encrypted with the second cryptographic key (SK2). Furthermore, although FIGS. 5A-5F illustrate only one change in cryptographic keys during a communication session for purposes of clarity, it should be understood that the process may be iterative in which a plurality (e.g., more than 2) cryptographic keys are used during a single communication session.

In some embodiments, the key delivery system 500 may employ further security features including an automated disconnect feature. As discussed above, the network devices 106 and 108 may exchange communications in order to agree upon a time or triggering event to switch from utilization of the first cryptographic key (SK1) to the second cryptographic key (SK2). However, when the first network device 106 does not receive a confirmation communication acknowledging and agreeing to the proposed time or other triggering event, the first network device 106 may be configured to continue to utilize the first cryptographic key (SK1) for a period of time. However, when no return communication has been received from the second network device 108 upon expiration of a predetermined time period, the first network device 106 may automatically terminate the communication session. In such a situation, termination of the communication session ensures that content will not be transmitted over a potentially comprised communication path.

Referring now to FIG. 6, an exemplary embodiment of a plurality of encrypted frames of data within a single communication session, illustrating the use of multiple keys within the single communication session is shown in accordance with some embodiments. FIG. 6 illustrates a data stream 600, such as a video stream, that is to be transmitted from a first network device to a second network device within an embodiment of the key delivery system as discussed above. As illustrated, the data stream 600 includes a first data segment 602 and a second data segment 604, in which the second data segment 604 immediately follows the first data segment 602. Further, each data segment may be comprised of a plurality of data frames (e.g., the data segment 602 is shown to be comprised of a plurality of data frames including the data frames 606, 608, 610 In one instance, the gap illustrated in FIG. 6 between the data segments may merely be for purposes of clarity and not indicate a prolonged delay in time between data frames 610 and 612.

As FIG. 6 illustrates, the data frame 606 may contain data encrypted with a first cryptographic key (SK1) indicated via the notation, "E[FRAME 1]$_{SK1}$"; the data frame 608 may contain data encrypted with the first cryptographic key (SK1) indicated via the notation, "E[FRAME 2]$_{SK1}$"; . . . and the data frame 610 may contain data encrypted with the first cryptographic key (SK1) indicated via the notation, "E[FRAME M]$_{SK1}$". As discussed above, the occurrence of an agreed upon or otherwise predetermined triggering event may cause the network devices to transition from encrypting data frames with a first cryptographic key (SK1) to a second cryptographic key (SK2). Thus, it may be assumed that a triggering event occurred between the encryption of the data frame 610 and the data frame 612, which is shown to be encrypted with the second cryptographic key (SK2). Specifically, the data frame 612 may contain data encrypted with the second cryptographic key (SK2) indicated via the notation, "E[FRAME M+1]$_{SK2}$"; the data frame 614 may contain data encrypted with the second cryptographic key (SK2) indicated via the notation, "E[FRAME M+N]$_{SK2}$". It is understood that the data fames included within the data segment 602 not specifically annotated may also be encrypted with the first cryptographic key (SK1) and the data fames included within the data segment 604 not specifically annotated may also be encrypted with the second cryptographic key (SK2).

III. Globalized Implementation

Figure 7A:
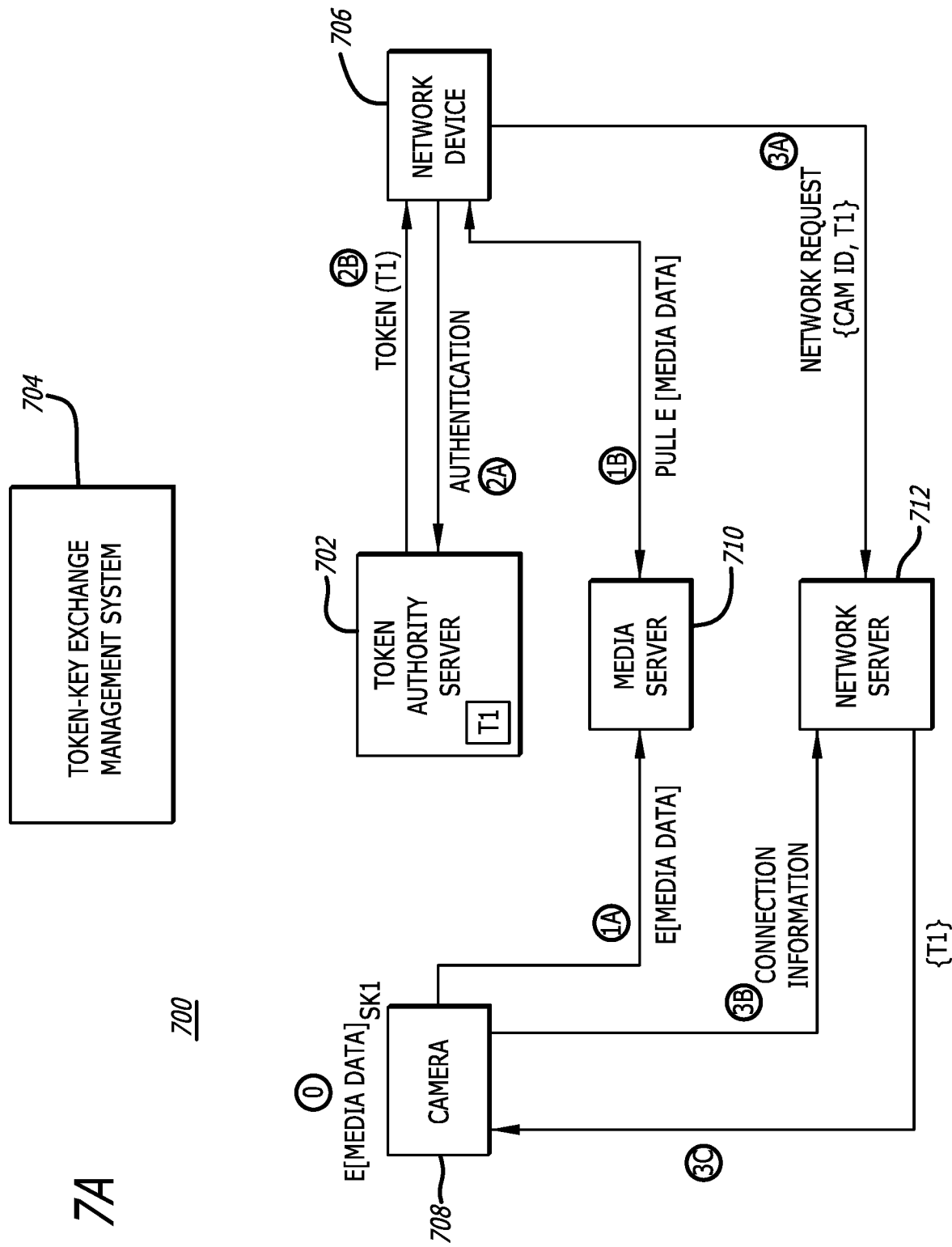
Figure 7B:
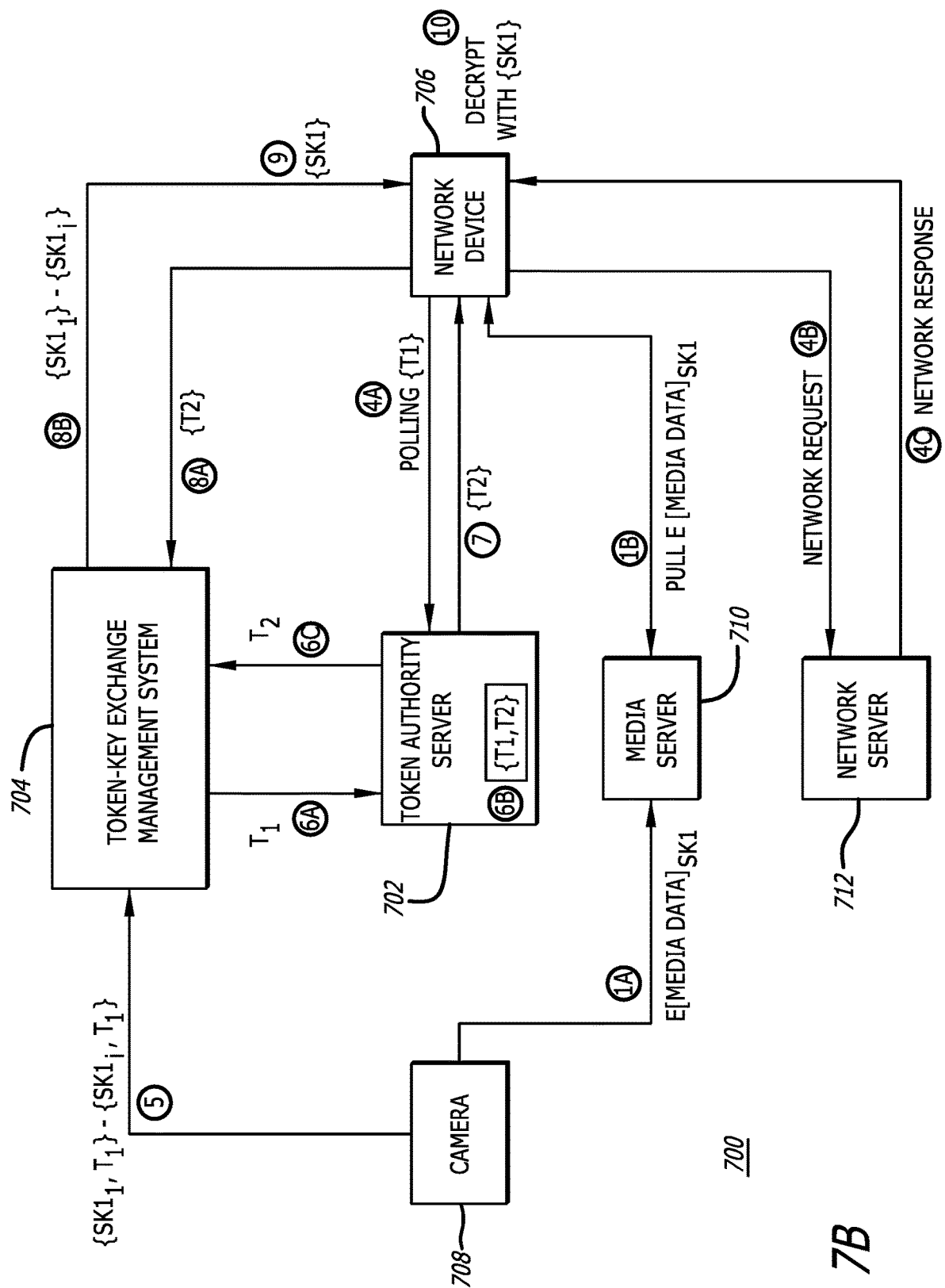
Figure 7D:
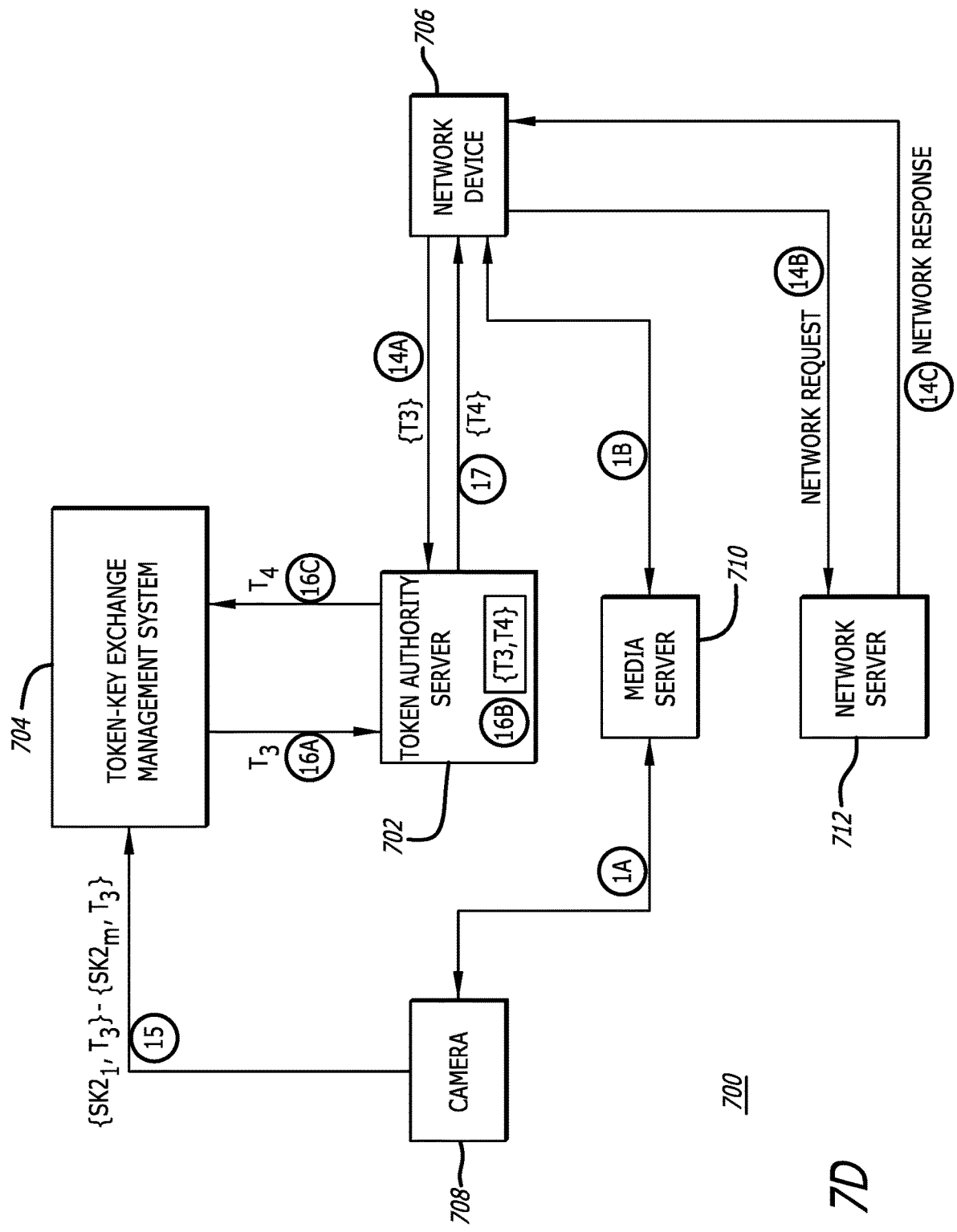

Referring to FIGS. 7A-7E, illustrations of a plurality of operations performed during a single communication session in a second embodiment are shown in accordance with some embodiments. In each of the illustrations of FIGS. 7A-7E, operations conducted by the key delivery system 700 in implementing the utilization of a plurality of cryptographic keys to encrypt/decrypt content transmitted from a network device 708 to a server device 710, and from the server device 710 to a network device 706 are shown. In particular, the operations illustrate the novel utilization of multiple cryptographic keys (SKs) within a single communication session. Further, FIGS. 7A-7E illustrate the encryption of content using a first cryptographic key (SK1) and FIGS. 7C-7E illustrate the implementation of a second cryptographic key (SK2) with some overlap of content encryption and transmission as is discussed in detail with respect to FIG. 8. It should be noted that a plurality of network devices may transmit requests to the server device 710 for the encrypted content transmitted by the network device 708. Each network device will participate in operations such as those discussed below in order to obtain the encryption key to decrypt the encrypted content. Examples of the media server 710 include, but are not limited or restricted to an APACHE KAFKA® service, an AMAZON KINESIS® service, a Secure Channels media server, or any media service gateway or portal.

The key delivery system 700 is similar to the key delivery system 200 of FIG. 2 with the inclusion of a media server 710 and a network server 712. In addition, although any content may be exchanged between the network devices 706 and 708, FIGS. 7A-7F illustrate the transmission of media data, such as a video stream, being transmitted from a camera 708 to the media server 710, which is polled by the network device 706 for the video stream. The media data discussed in the disclosure may have the form of a plurality of still images, silent video data, video data including audio and/or strictly audio data. In some embodiments, the network server 712 is a server device configured to transmit data using the Session Initiation Protocol (SIP) and may be referred to as a "SIP server." However, other protocols may be utilized including H.323, Media Gateway Control Protocol (MGCP), H.248, Real-time Transport Protocol (RTP), RTP Control Protocol (RTCP), Secure Real-time Transport Protocol (SRTP), Session Description Protocol (SDP), Inter-Asterisk eXchange (IAX), Jingle XMPP, etc.

Each of FIGS. 7A-7E includes a plurality of numerals, i.e., 0-21, with each numeral representing one or more operations performed by one or more components of the key delivery system 700 or transmission of the data within the key delivery system 700. Referring now to FIG. 7A, it is assumed that the camera 708 is turned on and recording media data, which is then encrypted using a first cryptographic key (SK1) (numeral 0). In addition, it is assumed in the embodiment illustrated in FIGS. 7A-7E that the network device 706 has access to a unique identifier corresponding to the camera 708 (e.g., stored thereon or in an accessible remote storage). The unique identifier, which may be an alphanumeric identifier (e.g., the letters A-Z, both uppercase and lowercase, and the numbers 0-9) or an alternative combination of alphanumeric symbols as well as other symbols (such as "special characters" such as punctuation characters). The disclosure includes all symbols and characters that may be used to identify the camera 708.

As long as the camera 708 is provided power and communicatively coupled to the media server 710, the camera 708 may continuously transmit encrypted media data to the media server 710. As will be discussed below, the camera 708 may alter the encryption key used at periodic, or non-periodic intervals. At a time when an operator or user of the network device 706 desires to view the media data being recorded by the camera 708, the network device 706 may poll the media server 710 and attempt to pull the media data by supplying at least the unique identifier of the camera 708 (numeral 1B). However, without having the encryption key used by the camera 708, the network device 706 has no means for decrypting the encrypted media content.

In order to obtain the necessary encryption key to decrypt the encrypted media content, the network device 706 exchanges certain information with the camera 708 via the network server 712. As a first step in process of obtaining the encryption key (with respect to FIG. 7A, the first encryption key SK1), the network device 706 conducts an authentication process with the token authority sever 702 (numeral 2A). For instance, the network device 706 may provide the token authority server 702 with identifying information such as biometric information of the user of the network device 706 obtained via one or more sensors located therein, as discussed above. In response to validation of the supplied identifying information, the token authority server 702 generates a first token (T1), which is in turn transmitted to the network device 706 (numeral 2B). As discussed above, the token authority server 702 stores the token (T1) in ephemeral memory. Similarly, upon receipt, the network device 706 may store the token (T1) in ephemeral memory.

Subsequent to receipt of the token (T1), the network device 706 transmits a communication to the network server 712 including the unique identifier of the camera 708 and the token (T1) (numeral 3A). Independently, the camera 708 transmits connection information to the network server (numeral 3B), which includes at least the unique identifier of the camera 708, the next key frame at which the encryption key will be switched, and the last N characters of the encryption key to be transmitted to the TKEM system 702 with the supplied token, e.g., token (T1). The last N characters refers to any number of characters less than the size of the encryption key, and in one embodiment N=3. The last N characters is utilized by the network device 706 in assembling the encryption key segments received from the TKEM system 702, as discussed below. As the communication from the network device 706 includes the unique identifier of the camera 708, the camera 708 is provided with the token (T1) (numeral 3C).

Referring now to FIG. 7B, the network device 706 transmits a token lookup message including the token (T1) to the token authority server 702 (numeral 4A). However, until the token authority server 702 has received token change request message including the token (T1) from the TKEM system 704 discussed below, the token authority server 702 does not have a token to provide the network device 706; thus, the network device 706 may repeatedly poll the token authority server 702 until a corresponding token is received therefrom. FIG. 7B illustrates a network request from the network device 706 to the network server 712 (numeral 4B), which may include the unique identifier of the camera 708 and the token (T1). A network response is transmitted to the network device 706 that includes at least the next key frame at which the encryption key will be switched, and the last N characters of the encryption key to be transmitted to the TKEM system 702 with the supplied token, e.g., token (T1) (numeral 4C). It should be noted that in some embodiments, the second network request (numeral 4B) may not be used and instead the network response including (numeral 4C) may be transmitted to the network device 706 based on the initial network request illustrated as numeral 3A. Further, the ordering of operations included within the numerals 3A-4C may be performed in any order and are not limited to the order illustrated in FIGS. 7A-7B.

Upon receiving the token (T1), the camera 708 separates the first cryptographic key (SK1) into a plurality of key fragments, e.g., "i" key segments (K1 . . . Ki, wherein i≥2), and stores the key segments in ephemeral memory. Following the separation of the first cryptographic key (SK1) into fragments, the camera 708 generates key value pairs (KVPs) comprising a key fragment and the token (T1). The KVPS are then transmitted to the TKEM system 704 in a plurality of transmissions (numeral 5A). Additionally, upon completion of the transmission of the KVPs to the TKEM system 704, the camera 708 transmits a completion acknowledgement communication (numeral 5B). In some embodiments, the transmission of the connection information from the camera 708 to the network server 712 and the transmission of a token from the network server 712 to the camera 708 (numerals 13B-13C as seen in FIG. 7C) represent a continuous polling operation performed by the camera 708. As an alternative to an individual communication, the completion acknowledgement communication may be included within communications comprising the continuous polling as represented by numerals 13B-13C.

The TKEM system 704 may include a plurality of relay servers (RS), such as the relay servers 204₁-204_N of FIG. 2 or FIGS. 5B-5C, although not shown in FIGS. 7A-7E. However, inclusion of relay servers is not necessary and, instead, the key delivery system 700 may operate in a similar manner as described above with respect to FIGS. 1A-1B.

When included in the TKEM system 702, the relay servers perform random (or pseudo-random) shuffling operations with retry capability to transfer the KVPs to different relay servers. As mentioned above, the shuffling obfuscates the location of at least the key segments (K1, K2) from the network device 706, such that each of the KVPs is assigned to a new, but different, relay server (hereinafter, "reassigned relay servers"). Following completion of the reshuffling of the KVPs, each reassigned relay servers establishes communications with the token authority server 702 and each issue a token change request messages to the token authority server 702, wherein each token change request message includes the token (T1) and an address of the sending relay server (numeral 6A). In response, the token authority server 702 generates a second token (T2) corresponding to the token (T1) and stores the tokens (T1, T2) in ephemeral memory (numeral 6B). The token (T2) is then returned to the relay servers via corresponding token change response messages (numeral 6C). It should be noted that the ordering of operations included within the numerals 4A-6C may be performed in any order and are not limited to the order illustrated in FIGS. 7A-7B.

As referenced above, when the token authority server 702 receives one or more token change request messages from the TKEM system 704, the tokens (T1, T2) are stored in ephemeral memory. As the network device 706 continues to transmit token lookup messages including the token (T1) to the token authority server 702 until it receives a response (numeral 4A) and following storage of the token pairing (T1, T2) in ephemeral memory, the token authority server 702 responds to the network device 706 with the token (T2) via a token lookup reply message (numeral 7). The token authority server 702 may then purge its ephemeral memory of the tokens (T1, T2).

As the network device 706 is now in possession of the token (T2), the network device 706 transmits a key segment request message to the TKEM system 704 (in some embodiments, to each of the relay servers, e.g., as separate unicast messages or as a multicast message) (numeral 8A). The key segment request message(s) include the second token (T2). The TKEM system 704 is prompted to return any key segment corresponding to the second token (T2) via key segment response message(s) (numeral 8B). Based on the received key segment response message(s), the network device 706 reassembles the first cryptographic key (SK1) (numeral 9), which enables the decryption of the received encrypted content, E[content] (numeral 10).

Referring now to FIG. 7C, the camera 708 may continue to transmit the encrypted media data using the first encryption key (SK1) for the duration of a first interval. In order to provide an additional security measure, the camera 708 alters the encryption key it uses at predetermined intervals (periodic or non-periodic). In some embodiments, the intervals may have a duration of 60 seconds; however, the disclosure not limited to this duration and the duration may differ. Further, each interval need not have the same duration and the key strength of the encryption keys may differ as well. As referenced above, a key modulation logic stored on the camera 708 (such as the key modulation logic 324 of FIG. 3) may dictate a particular key strength (e.g., a key size in bits). The duration of an interval may be provided to the network device 706 via the connection information transmitted by the camera 708 to the network server 712, which includes at least the next key frame at which the encryption key will be switched. Upon receiving such information, the network device 706 obtains the key frame of each frame within the media data following decryption and prepares to switch to the next encryption key at the indicated time (e.g., receipt of the indicated key frame).

During the first interval and concurrent to the exchange of content encrypted with the first cryptographic key (SK1), the camera 708 and the network device 706 each begin a process to transition from utilization of the first cryptographic key (SK1) to a second cryptographic key (SK2). For instance, the camera 708 generates or retrieves a second encryption key (SK2) and begins encrypting the media data stream using the second encryption key (SK2) (numeral 11). As will be discussed below and is illustrated in detail in FIG. 8, the camera 708 encrypts the media data using both the first encryption key (SK1) and the second encryption key (SK2) in a concurrent manner in order to avoid a glitch at the network device 706 at the indicated next key frame referenced above.

Prior to the expected time of receipt of the indicated next key frame, the network device 706 transmits a token request message to the token authority server 702 in order to begin the process of obtaining the second encryption key (SK2) in a similar manner as discussed above with respect to numerals 1-10 (numeral 12A). The token authority server 702 sends back a third token (T3) (numeral 12B), and the network device 706 transmits a communication to the network server 712 including the unique identifier of the camera 708 and the token (T3) (numeral 13A). Independently, the camera 708 transmits connection information to the network server (numeral 13B), which includes at least the unique identifier of the camera 708, the next key frame at which the encryption key will be switched, and the last N characters of the encryption key to be transmitted to the TKEM system 702 with the supplied token, e.g., token (T3). As the communication from the network device 706 includes the unique identifier of the camera 708, the camera 708 is provided with the token (T3) (numeral 13C). In some embodiments as referenced above, upon completion of the transmission of the KVPs to the TKEM system 704, the camera 708 transmits a completion acknowledgement communication, which may be included in the same transmission as the connection information of numeral 13B.

Referring now to FIG. 7D, the network device 706 transmits a token lookup message including the token (T3) to the token authority server 702 (numeral 14A). However, until the token authority server 702 has received token change request message including the token (T3) from the TKEM system 704 discussed below, the token authority server 702 does not have a token to provide the network device 706; thus, the network device 706 may repeatedly poll the token authority server 702 until a corresponding token is received therefrom. FIG. 7D illustrates a network request from the network device 706 to the network server 712 (numeral 14B), which may include the unique identifier of the camera 708 and the token (T3). A network response is transmitted to the network device 706 that includes at least the next key frame at which the encryption key will be switched, and the last N characters of the encryption key to be transmitted to the TKEM system 702 with the supplied token, e.g., token (T3) (numeral 14C). As discussed above, the second network request (numeral 4B) may not be used and instead the network response including (numeral 4C) may be transmitted to the network device 706 based on the initial network request illustrated as numeral 13A. Further, the ordering of operations included within the numerals 13A-14C may be performed in any order and are not limited to the order illustrated in FIGS. 7C-7D.

Upon receiving the token (T3), the camera 708 separates the second cryptographic key (SK2) into a plurality of key fragments, e.g., "M" key segments (K1 . . . KM, wherein M≥2), and stores the key segments in ephemeral memory. Following the separation of the second cryptographic key (SK2) into fragments, the camera 708 generates key value pairs (KVPs) comprising a key fragment and the token (T3). The KVPS are then transmitted to the TKEM system 704 in a plurality of transmissions (numeral 15).

Similar to the discussion above regarding inclusion of relay servers within the TKEM system 702, the relay servers perform random (or pseudo-random) shuffling operations with retry capability to transfer the KVPs to different relay servers. The TKEM system 704 establishes communication(s) with the token authority server 702 and issues one or more token change request messages to the token authority server 702, wherein each token change request message includes at least the token (T3) (numeral 16A). In response, the token authority server 702 generates a fourth token (T4) corresponding to the token (T3) and stores the tokens (T3, T4) in ephemeral memory (numeral 16B). The token (T4) is then returned to the TKEM system 704 via one or more corresponding token change response messages (numeral 16C). It should be noted that the ordering of operations included within the numerals 14A-C6C may be performed in any order and are not limited to the order illustrated in FIG. 7D.

As referenced above, when the token authority server 702 receives one or more token change request messages from the TKEM system 704, the tokens (T3, T4) are stored in ephemeral memory. As the network device 706 continues to transmit token lookup messages including the token (T3) to the token authority server 702 until it receives a response (numeral 14A) and following storage of the token pairing (T3, T4) in ephemeral memory, the token authority server 702 responds to the network device 706 with the token (T4) via a token lookup reply message (numeral 17). The token authority server 702 may then purge its ephemeral memory of the tokens (T3, T4).

Referring to FIG. 7E, as the network device 706 is now in possession of the token (T4), the network device 706 transmits a key segment request message to the TKEM system 704 (in some embodiments, to each of the relay servers, e.g., as separate unicast messages or as a multicast message) (numeral 18A). The key segment request message(s) include the second token (T4). The TKEM system 704 is prompted to return any key segment corresponding to the second token (T4) via key segment response message(s) (numeral 18B). Based on the received key segment response message(s), the network device 706 reassembles the first cryptographic key (SK2) (numeral 19). As referenced above, the camera 708 encrypts the media content using both the first encryption key (SK1) and the second encryption key (SK2) in a current manner. Further, the encrypted media data may be transmitted in a concurrent manner to the media server 710 using multiple communication channels (numerals 1A and 20A). Additionally, the network device 706 prepares for receipt of the indicated next key frame by polling the media server 710 for encrypted media data transmitted on both communication channels.

In some embodiments, the network device 706 is provided with information regarding the communication channels to which has access. Such communication channel information may be set forth by a system administrator. In other embodiments, communication channel information may be set forth in an Access Control Lists (ACL). In other embodiments, the communication channel information may be obtained by the network device 706 through an access rights management portal (or other access governance tool) that enables a first network device to access second network device via configuration settings For a short period prior to the end of the first interval (e.g., the duration of the use of first encryption key (SK1)), the network device 706 begins decrypting the media data with both the first encryption key (SK1) and the second encryption key (SK2) in a current manner (numerals 10 and 20). When media data encrypted with the first encryption key (SK1) is no longer transmitted to the media server 710, the network device 706 continues to poll the media server 710 for the media data encrypted with the second encryption key (SK2) and will eventually begin to prepare for the end of the second interval and beginning of a third interval, which will see the camera 708 utilize a third encryption key (SK3). The process discussed above with respect to transitioning from the first interval (using the first encryption key (SK1)) to the second interval (using the second encryption key (SK2)) is repeated for each subsequent change in intervals for the duration the user or operator of the network device 706 desires to obtain media data from the camera 708.

Figure 8:
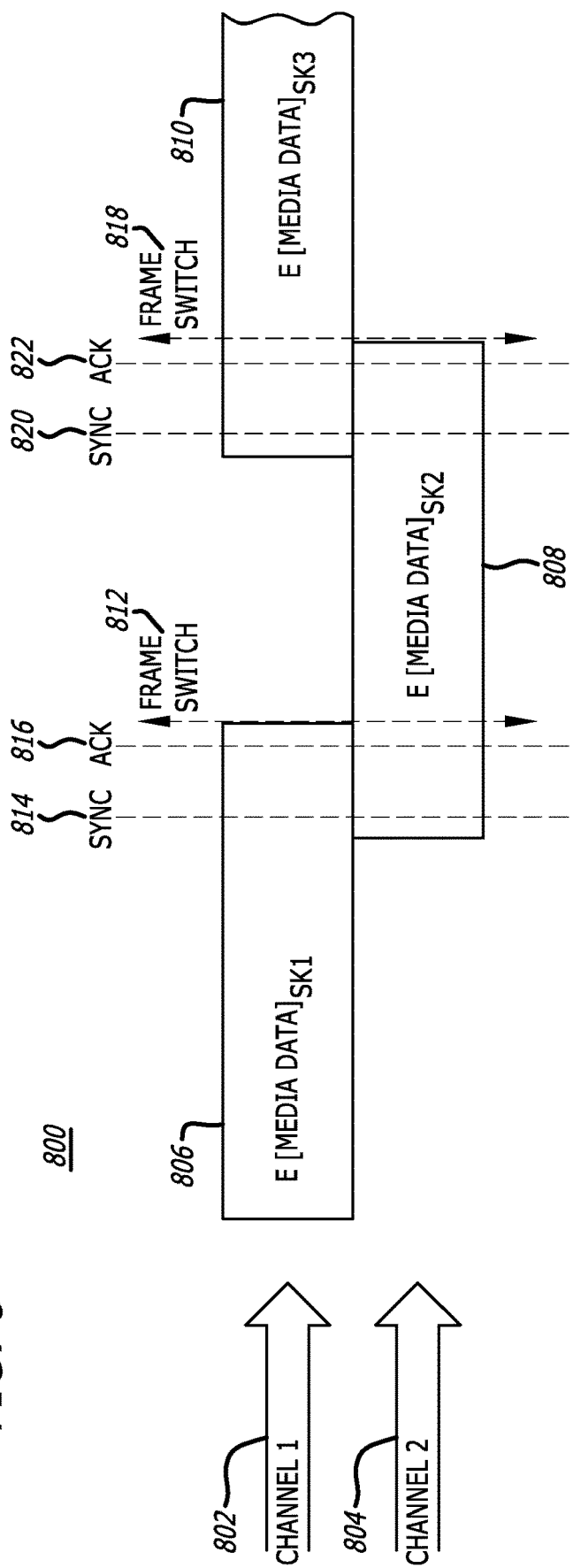
FIG. 8 is an illustration of transmission of encrypted content from a first network device to a server device over a plurality of communication channels in accordance with some embodiments.

Referring now to FIG. 8, an illustration of transmission of encrypted content from a first network device to a server device over a plurality of communication channels is shown in accordance with some embodiments. Two communication channels ("channel 1 802" and "channel 2 804") are illustrated in FIG. 8, over which encrypted content, e.g., a media data stream, is transmitted from a first network device, such as the camera 708 of FIGS. 7A-7E, to a server device, such as the media server 710 also of FIGS. 7A-7E. The use of the terms "channel 1" and "channel 2" may correspond to wireless network channels. As is known in the art, transmission at 2.4 GHz may be on one of 11 bands (or "channels"), wherein FIG. 8 refers to two of the 11 channels. Further, the use of "channel 1" and "channel 2" is not limited to channel 1 and channel 2 but is merely representing a first channel and a second channel of any wireless channel (e.g., on 2.4 GHz, 5 GHz, etc.). The transmission the encrypted media data of FIG. 8 illustrates the procedure performed by the camera 708 in order to avoid a glitch at a second network device, such as the network device 706 of FIGS. 7A-7E, caused by a delay at the network device 706 when a first interval in which a first encryption key is used transitions to a second interval in which a second encryption key is used.

In FIG. 8, media data 806 is illustrated as being encrypted using a first encryption key (SK1) and transmitted over channel 1 802 during a first interval, e.g., frames 0-1999 which may correspond to time $t_0$-time $t_{59}$ representing a 60 second interval. As discussed above, the duration of the interval is not limited to 60 seconds (or 2000 frames) and may be any duration greater than 0 seconds. Further, at $t_{45}$, which is prior to the transition from the first interval to the second interval, the camera 708 may begin transmitting media data 808 over channel 2 encrypted with a second encryption key (SK2). The encrypted media data 808 transmitted at $t_{45}$-$t_{59}$ is a duplicate of the encrypted media data 806 transmitted during the same time frame.

The network device 706 may initiate a key request process for the second encryption key (SK2) at $t_{50}$, labeled at "SYNC 814" and may obtain and reassemble the second encryption key (SK2) at $t_{55}$, labeled at "ACK 816." Therefore, the network device 706 has time to begin decrypting the encrypted media data 808 prior to the frame switch 812 (e.g., frame 2000 at time $t_{60}$) in order to avoid a glitch in the display of the media data. For example, at the frame switch 812 (frame 2000), the network device 706 may switch the view panel of a display screen from displaying media data received on channel 1 802 to media data received on channel 2 804.

The frame switch 812 is based on numbered frames within the media data 806, 808, 810, etc. As discussed above, the camera 708 transmits encrypted media data having numbered frames to the media server 710 and provides "next 'last frame'" information to the network server 712, which is obtained by the network device 706. Based on the indicated "next 'last frame'" information (e.g., an indication of the frame switch 812), the network device 706 switches from displaying media data received on channel 1 802 to media data received on channel 2 804.

Although FIG. 8 illustrates that transmission of the media data 806 on channel 1 802 occurs at the frame switch 812, additional frames of the media data 806 encrypted with the first encryption key (SK1) may be transmitted (e.g., frames 2000-2100) in order to enable the network device 706 to continue displaying the media data 806 if there is an issue or delay in retrieving and reassembling the second encryption key (SK2). However, after a certain period (e.g., of a configurable length), transmission of the media data 806 encrypted with the first encryption key (SK1) ceases to ensure security of the transmission of media data from the camera 708 to the media server 710 to the network device 706.

The same process discussed above occurs with respect to the frame switch 818. The camera 708 begins transmitting the media data 810 encrypted with a third encryption key (SK3) prior to the time of the frame switch 818 to enable the network device 706 to initiate a key request process ("SYNC 820") for the third encryption key (SK3), and retrieve and reassemble the third encryption key (SK3) ("ACK 822") prior to the frame switch 818.

Based on the indicated "next 'last frame'" information (e.g., an indication of the frame switch 818) transmitted from the camera 708 to the network server 710 to the network device 706, the network device 706 switches from displaying media data received on channel 2 804 to media data received on channel 1 802 at the frame switch 818, wherein the term "frame switch" may refer to a designated frame at which the switch between channels is to occur.

Figure 9:
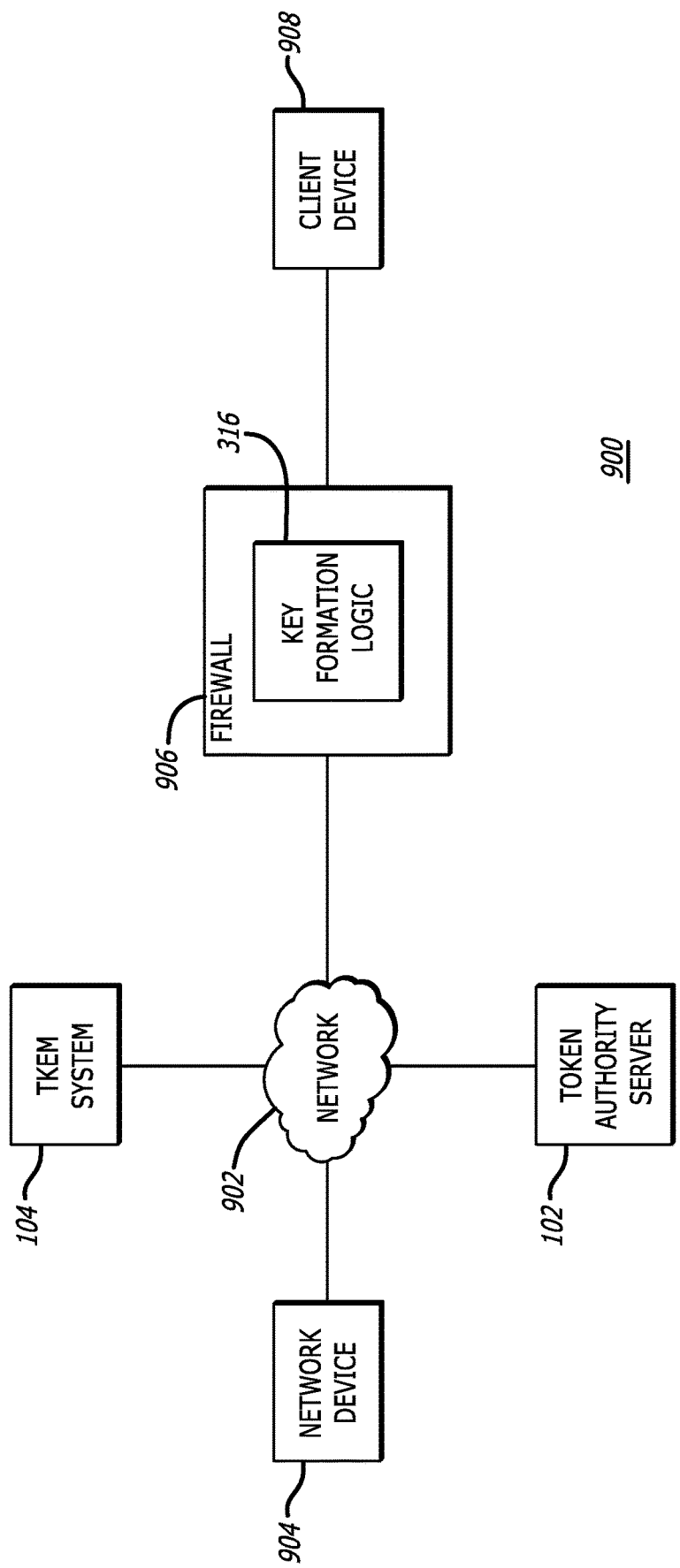
FIG. 9 is an exemplary block diagram of a communication system deploying a firewall including key formation logic in accordance with some embodiments.

Referring now to FIG. 9, an exemplary block diagram of a communication system 900 deploying network 902 and a firewall 906 including key formation logic 316 is shown in accordance with some embodiments. In particular, the network 902 communicatively couples a network device 904 with the firewall 906, behind which a client device 908 is deployed. Additionally, each of the network device 904 and the firewall 906 are in communication with the TKEM system 104 and the token authority server 102.

As referenced above, aspects of the key delivery system 100, 200, 500 or 700 of FIGS. 1A-1B, 2, 5A-5G and 7A-7E may be incorporated into the communication system 900. As noted, in a typical VPN deployment, a public-key/private-key certificate secured communication session is established between a VPN client (e.g., the network device 902) and the VPN server (e.g., the firewall 906). Specifically, the firewall 906 may incorporate the key formation logic 316 enabling the firewall 906 to communicate with the TKEM system 104, the token authority server 102 and the network device 904 via the network 902. The firewall 906 may utilize an encryption mechanism (e.g., AES encryption or "Xotic" encryption) as well as the encryption technique having modulated encryption-strength as discussed above with respect to FIGS. 1A-8. Specifically in such embodiments, the TKEM system 104 brokers the key exchange between network device 904 and the firewall 906. In such a deployment, the operations discussed above as performed by either the network device 106 or the network device 108 may be performed by the firewall 906.

Figure 10:
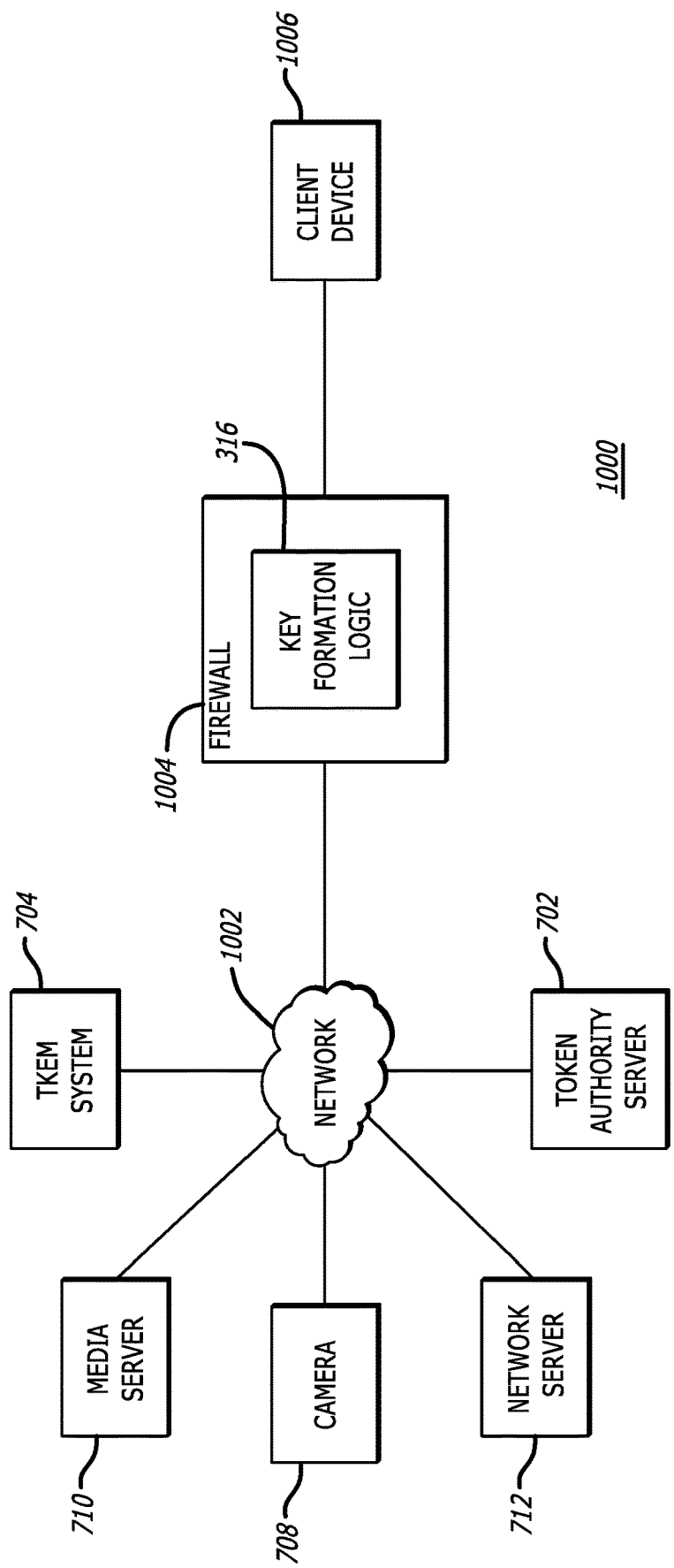
FIG. 10 is an exemplary block diagram of a communication system deploying a plurality of components from the key delivery system of FIGS. 7A-7E and a firewall including key formation logic is shown in accordance with some embodiments.

Referring now to FIG. 10, an exemplary block diagram of a communication system 1000 deploying a plurality of components from the key delivery system 700 of FIGS. 7A-7E and a firewall 1004 including key formation logic 316 is shown in accordance with some embodiments. In particular, the network 1002 communicatively couples the camera 708 with the firewall 1004, behind which a client device 1006 is deployed. Additionally, the camera 708 may be communicatively coupled to the media server 710, the network server 712 and the TKEM system 704 as discussed in FIGS. 7A-7E.

In the embodiment of FIG. 10, aspects of the key delivery system 700 of FIGS. 7A-7E are incorporated into the communication system 1000. With respect to the embodiment illustrated, a public-key/private-key certificate secured communication session may established between the camera 708 and the firewall 1004 (e.g., a VPN server). Specifically, the firewall 1006 may incorporate the key formation logic 316 enabling the firewall 1004 to communicate with the TKEM system 704, the token authority server 702, the media server 710 and the network server 712 via the network 1002. The firewall 1004 may utilize an encryption mechanism (e.g., AES encryption or "Xotic" encryption) as well as the encryption technique having modulated encryption-strength as discussed above with respect to, for example, FIGS. 7A-7E. Specifically in the embodiment of FIG. 10, the TKEM system 704 and the network server 712 broker the key exchange between the camera 708 and the firewall 1004 enabling the firewall 1004 to pull encrypted content (e.g., a media data stream) from the media server 710. Further, the operations discussed above as performed by the network device 706 may be performed by the firewall 1004.

In the foregoing description, the invention is described with reference to specific exemplary embodiments thereof. It will, however, be evident that various modifications and changes may be made thereto without departing from the broader spirit and scope of the invention as set forth in the appended claims.

What is claimed is:

1. A computerized method comprising:
establishing, by a first network device, a communication session with a second network device;
transmitting first content to the second network device during the communication session, wherein the first content is encrypted with a first encryption format;
transmitting second content to the second network device during the communication session, wherein the second content is encrypted with a second encryption format;
performing, by the first network device, an authentication process with a token authority;
receiving a first token from the token authority;
splitting a first cryptographic key corresponding to the first encryption format into a plurality of cryptographic key fragments;
providing a first key value pair to a first relay server, wherein the first key value pair includes a first cryptographic key fragment of the plurality of cryptographic key fragments and the first token; and
providing a second key value pair to a second relay server, wherein the second key value pair includes a second cryptographic key fragment of the plurality of cryptographic key fragments and the first token, wherein the first relay server is geographically separated from the second relay server.

2. The computerized method of claim 1 further comprising:
receiving, from the second network device, third content during the communication session, wherein the third content is encrypted with the first encryption format; and
decrypting the third content using a first cryptographic key corresponding to the first encryption format.

3. The computerized method of claim 1, wherein the first encryption format corresponds to encryption with the first cryptographic key having a first key size and the second encryption format corresponds to encryption with a second cryptographic key having a second key size different than the first key size.

4. The computerized method of claim 3, wherein the first key size and the second key size are each selectable via user input.

5. The computerized method of claim 3, wherein the first key size and the second key size are each predetermined according to a configuration file accessible by the first network device.

6. A non-transitory storage medium having logic stored thereon, the logic being executable by one or more processors to perform operations including:
establishing, by a first network device, a communication session with a second network device;
transmitting first content to the second network device during the communication session, wherein the first content is encrypted with a first encryption format;
transmitting second content to the second network device during the communication session, wherein the second content is encrypted with a second encryption format;
performing, by the first network device, an authentication process with a token authority;
receiving a first token from the token authority;
splitting a first cryptographic key corresponding to the first encryption format into a plurality of cryptographic key fragments;
providing a first key value pair to a first relay server, wherein the first key value pair includes a first cryptographic key fragment of the plurality of cryptographic key fragments and the first token; and
providing a second key value pair to a second relay server, wherein the second key value pair includes a second cryptographic key fragment of the plurality of cryptographic key fragments and the first token, wherein the first relay server is geographically separated from the second relay server.

7. The non-transitory storage medium of claim 6, wherein the operations further include:
receiving, from the second network device, third content during the communication session, wherein the third content is encrypted with the first encryption format; and
decrypting the third content using a first cryptographic key corresponding to the first encryption format.

8. The non-transitory storage medium of claim 6, wherein the first encryption format corresponds to encryption with the first cryptographic key having a first key size and the second encryption format corresponds to encryption with a second cryptographic key having a second key size different than the first key size.

9. The non-transitory storage medium of claim 8, wherein the first key size and the second key size are each selectable via user input.

10. The non-transitory storage medium of claim 8, wherein the first key size and the second key size are each predetermined according to a configuration file accessible by the first network device.

11. A system comprising:
one or more processors; and
a non-transitory, computer-readable medium communicatively coupled to the one or more processors and having instructions stored thereon, the instructions, when executed by the one or more processors, causing performance of operations including:
establishing, by a first network device, a communication session with a second network device;
transmitting first content to the second network device during the communication session, wherein the first content is encrypted with a first encryption format;
transmitting second content to the second network device during the communication session, wherein the second content is encrypted with a second encryption format;
performing, by the first network device, an authentication process with a token authority;
receiving a first token from the token authority;
splitting a first cryptographic key corresponding to the first encryption format into a plurality of cryptographic key fragments;
providing a first key value pair to a first relay server, wherein the first key value pair includes a first cryptographic key fragment of the plurality of cryptographic key fragments and the first token; and
providing a second key value pair to a second relay server, wherein the second key value pair includes a second cryptographic key fragment of the plurality of cryptographic key fragments and the first token, wherein the first relay server is geographically separated from the second relay server.

12. The system of claim 11, wherein the operations further include:
receiving, from the second network device, third content during the communication session, wherein the third content is encrypted with the first encryption format; and
decrypting the third content using a first cryptographic key corresponding to the first encryption format.

13. The system of claim 11, wherein the first encryption format corresponds to encryption with the first cryptographic key having a first key size and the second encryption format corresponds to encryption with a second cryptographic key having a second key size different than the first key size.

14. The system of claim 13, wherein the first key size and the second key size are each selectable via user input.

15. The system of claim 13, wherein the first key size and the second key size are each predetermined according to a configuration file accessible by the first network device.

* * * * *